United States Patent
Zimmerman et al.

(10) Patent No.: US 11,145,899 B2
(45) Date of Patent: *Oct. 12, 2021

(54) LITHIUM METAL BATTERY WITH SOLID POLYMER ELECTROLYTE

(71) Applicant: IONIC MATERIALS, INC., Woburn, MA (US)

(72) Inventors: Michael A. Zimmerman, No. Andover, MA (US); Randolph Leising, No. Andover, MA (US)

(73) Assignee: IONIC MATERIALS, INC., Woburn, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/776,088

(22) Filed: Jan. 29, 2020

(65) Prior Publication Data

US 2020/0168951 A1 May 28, 2020

Related U.S. Application Data

(63) Continuation of application No. 15/579,476, filed as application No. PCT/US2016/035628 on Jun. 3, 2016, now Pat. No. 10,553,901.

(60) Provisional application No. 62/170,963, filed on Jun. 4, 2015.

(51) Int. Cl.

| | |
|---|---|
| *H01M 8/10* | (2016.01) |
| *H01M 10/0565* | (2010.01) |
| *H01M 4/505* | (2010.01) |
| *H01M 4/525* | (2010.01) |
| *H01M 10/052* | (2010.01) |
| *H01M 10/42* | (2006.01) |

(52) U.S. Cl.
CPC ....... *H01M 10/0565* (2013.01); *H01M 4/505* (2013.01); *H01M 4/525* (2013.01); *H01M 10/052* (2013.01); *H01M 10/4235* (2013.01); *H01M 2300/0082* (2013.01)

(58) Field of Classification Search
CPC ........... H01M 10/0565; H01M 10/052; H01M 10/0525; H01M 10/505; H01M 4/505; H01M 4/525; H01M 2300/0082
See application file for complete search history.

(56) References Cited

U.S. PATENT DOCUMENTS

| | | |
|---|---|---|
| 3,257,241 A | 6/1966 | Tamminen |
| 5,378,560 A | 1/1995 | Tomiyama |
| 5,569,559 A | 10/1996 | Fauvarque |
| 5,660,953 A | 8/1997 | Bai et al. |
| 5,713,169 A | 2/1998 | Meier et al. |
| 5,917,693 A | 6/1999 | Kono et al. |
| 5,989,742 A | 11/1999 | Cabasso et al. |
| 6,413,676 B1 | 7/2002 | Munshi |
| 6,455,202 B1 | 9/2002 | Marugan et al. |
| 6,630,271 B1 | 10/2003 | Arcella et al. |
| 7,070,882 B1 | 7/2006 | Ferrando |
| 7,455,935 B2 | 11/2008 | Abe et al. |
| 8,227,105 B1 | 7/2012 | Gerald, II et al. |
| 8,753,594 B1 | 6/2014 | Burba, III et al. |
| 8,906,556 B2 | 12/2014 | Hambitzer |
| 10,553,901 B2* | 2/2020 | Zimmerman ......... H01M 4/505 |
| 2002/0048706 A1 | 4/2002 | Mayes et al. |
| 2003/0013012 A1 | 1/2003 | Ahn et al. |
| 2003/0138702 A1 | 7/2003 | Gerald, II et al. |
| 2004/0023116 A1 | 2/2004 | Fujino et al. |
| 2004/0241553 A1 | 12/2004 | Abe et al. |
| 2005/0164085 A1 | 7/2005 | Bofinger et al. |
| 2007/0015047 A1 | 1/2007 | Hosaka et al. |
| 2008/0118826 A1 | 5/2008 | Shimamura et al. |
| 2009/0197183 A1 | 8/2009 | Kato |
| 2009/0246636 A1 | 10/2009 | Chiang et al. |
| 2011/0020708 A1 | 1/2011 | Fujiki et al. |
| 2011/0027666 A1 | 2/2011 | Burchardt et al. |

(Continued)

FOREIGN PATENT DOCUMENTS

| | | |
|---|---|---|
| CN | 1592937 A | 3/2005 |
| CN | 1965436 A | 5/2007 |

(Continued)

OTHER PUBLICATIONS

Diez-Pascual, A., et al. "High-Performance Aminated Poly(phenylene sulfide)/ZnO Nanocomposites for Medical Applications." ACS Applied Materials & Interfaces 6, No. 13 (Jun. 13, 2014), 10132-10145.

Wu, Y., ed., "Chapter 11: Solid Electrolyte." In Lithium Ion Battery Application and Practice, Chemical Industry Press, China: Chemical Industry Press, 2011. Cited in Third Office Action for CN 2015/80018411.6. Art is summarized in the attached foreign Office Action citing the art, and a translation of the summary with the translator signature is attached.

Hayashi, A. et al., "Superionic glass-ceramic electrolytes for room-temperature rechargeable sodium batteries," Nature Communications, 3:856, pp. 1-5, Macmillan Publishers Limited (May 22, 2012).

(Continued)

*Primary Examiner* — Raymond Alejandro
(74) *Attorney, Agent, or Firm* — Burns & Levinson, LLP; Joseph M. Maraia

(57) ABSTRACT

A battery comprising: an anode comprising a first electrochemically active material: a cathode comprising both a second electrochemically active material and a first electrolyte; and a second electrolyte interposed between the anode and the cathode; wherein at least one of the first electrolyte and second electrolyte comprises a solid polymer electrolyte; wherein the solid polymer electrolyte has a glassy state, and comprises both at least one cationic diffusing ion and at least one anionic diffusing ion; wherein at least one of the at least one cationic diffusing ions comprises lithium; wherein at least one of the at least cationic diffusing ion and the at least one of the anionic diffusing ion is mobile in the glassy state; and wherein the first electrochemically active material comprises a lithium metal.

72 Claims, 8 Drawing Sheets

(56) References Cited

U.S. PATENT DOCUMENTS

| | | | |
|---|---|---|---|
| 2011/0111287 A1 | 5/2011 | Sayre et al. | |
| 2011/0223477 A1 | 9/2011 | Nelson et al. | |
| 2011/0223518 A1 | 9/2011 | Hirakimoto | |
| 2012/0189897 A1 | 7/2012 | Wakizaka et al. | |
| 2012/0208091 A1 | 8/2012 | Tsai et al. | |
| 2013/0136981 A1* | 5/2013 | Peuchert | H01M 50/431 |
| | | | 429/188 |
| 2013/0149436 A1 | 6/2013 | Hsieh et al. | |
| 2014/0004431 A1 | 1/2014 | Yamaguchi et al. | |
| 2014/0079995 A1 | 3/2014 | Wakada | |
| 2015/0146452 A1 | 5/2015 | Kim et al. | |
| 2015/0180037 A1 | 6/2015 | Gronwald et al. | |
| 2015/0364791 A1 | 12/2015 | Vu et al. | |
| 2016/0028133 A1* | 1/2016 | Miles | H01M 12/08 |
| | | | 429/405 |
| 2016/0118685 A1* | 4/2016 | Zhang | H01M 10/052 |
| | | | 429/305 |
| 2016/0233510 A1 | 8/2016 | Onodera et al. | |
| 2016/0365553 A1 | 12/2016 | Kountz et al. | |
| 2018/0219210 A1 | 8/2018 | Kim | |
| 2018/0241031 A1 | 8/2018 | Pan et al. | |

FOREIGN PATENT DOCUMENTS

| | | |
|---|---|---|
| CN | 101290985 A | 10/2008 |
| JP | 04-267055 A | 9/1992 |
| JP | 2004-265675 A | 9/2004 |
| JP | 2005/535076 A | 11/2005 |
| JP | 2006-210089 A | 8/2006 |
| JP | 2007-080642 A1 | 3/2007 |
| JP | 2010-509719 A | 3/2010 |
| JP | 2011-28976 A | 2/2011 |
| JP | 2014-067638 A | 4/2014 |
| JP | 2014-112560 A | 6/2014 |
| KR | 10-2008-0023294 A | 3/2008 |
| KR | 10-2011-0106342 A | 9/2011 |
| KR | 10-2012-0117853 A | 10/2012 |
| WO | 2006/019064 A2 | 2/2006 |
| WO | 2016/197098 A1 | 12/2016 |
| WO | 2019/065066 A1 | 4/2019 |
| WO | 2019/126532 A1 | 6/2019 |
| WO | 2020/005700 A1 | 1/2020 |

OTHER PUBLICATIONS

Moharram, M.A. et al., "Electrical Conductivity of Poly(acrylic acid)—Polyacrylamide Complexes," Journal of Applied Polymer Science, vol. 68, pp. 2049-2055, John Wiley & Sons, Inc. (1998).

Wu, G.M. et al., "Alkaline Zn-air and Al-air cells based on novel solid PVA/PAA polymer electrolyte membranes," Journal of Membrane Science, 280, pp. 802-808, Elsevier B.V. (2006; published online Apr. 4, 2006).

Zhang, Z. et al., "All-solid-state Al-air batteries with polymer alkaline gel electrolyte," Journal of Power Sources., 251, pp. 470-475, Elsevier B.V (2014), available online Nov. 20, 2013.

Fedelich, N., Application Handbook Thermal Analysis of Polymers Selected Applications Thermal Analysis. Retrieved from the Internet: https://www.mt.com/dam/LabDiv/guides-glen/ta-polymer/TA_Polymers_Selected_Apps_EN.pdf.

Imrie, C.T. et al., "Ion Transport in Glassy Polymer Electrolytes," Journal of Physical Chemistry B, vol. 103, No. 20, pp. 4132-4138, 1999.

Lefkowitz et al., "Influence of pH on the Reductive Transformation of Birnessite by Aqueous Mn(II)," Environmental Science & Technology, vol. 47, pp. 10364-10371, 2013.

Lu, Y. et al., "Platinum-Gold Nanoparticles: A Highly Active Bifunctional Electrocatalyst for Rechargeable Lithium-Air Batteries," Journal of the American Chemical Society vol. 132, No. 35, pp. 12170-12171, 2010.

Lu, Cuihong and Pan, Chunyue, "A Review on Factors Influencing Ionic Conductivity of Polymer Electrolyte," Materials Reports, pp. 58-60, 38, Apr. 17, 2003. Chinese with English translation.

Persson et al., "Materials Data on MnO2 (SG:164) by Materials Project," database entry #mp-25558, Nov. 2014 [retrieved via <https://doi.org/10.17188/1200755>].

Taib, N. U. et al., "Plastic crystal-solid biopolymer electrolytes for rechargeable lithium batteries," Journal of Membrane Science, vol. 468, pp. 149-154, 2014.

Wang et al., "The effects of Mn loading on the structure and ozone decomposition activity of MnOx supported on activated carbon," Chinese Journal of Catalysis, vol. 35, No. 3, pp. 335-341, Mar. 13, 2014.

Yu et al., "Solution-combustion synthesis of epsilo-MnO2 for supercapacitors," Materials Letters, vol. 64, pp. 61-64, Oct. 9, 2009.

Chiu, H.-T. et al., "Intermolecular Interactions and Aggregated Structures in Poly(p-phenylene sulfide) Doped with Some Organic Acceptors," Kobunshi Ronbunshu, vol. 41, No. 9, pp. 525-529, 1984. English abstract only, p. 529.

Wu, Y., ed., "Lithium Ion Battery Application and Practice," Chapter 11: Solid Electrolyte. Chinese; cited in Third Office Action for CN 2015/80018411.6. Art is summarized in the attached foreign Office Action citing the art, and a translation of the summary with the translator signature is attached.

Ye et al., Dictionary of Weapon Industry Science and Technology Exploder, edited by Ye Ying, National Defense Industry Press, published in Dec. 1991, p. 13-134.

* cited by examiner

LITHIUM METAL BATTERY WITH SOLID POLYMER ELECTROLYTE

FIELD OF THE INVENTION

One or more embodiments relate to electrodes including a solid polymer electrolyte, manufacturing methods thereof, and lithium batteries containing the same.

DESCRIPTION OF THE RELATED TECHNOLOGY

Lithium secondary batteries, provide an energy density by generating a discharge voltage below around 4.0 Volts. However, at higher voltages the typical electrolytes used in these batteries can decompose and limit the life of the battery. The electrolytes that have been developed so far do not afford such a high state of charge, and electrolyte stability at satisfactory levels.

Typical electrolytes used in lithium secondary batteries also limit the temperature range of useful performance of such batteries. A solid ionically conductive polymer material with high conductivity over a wide range of temperatures, including room temperature and below has been demonstrated to provide high performance over a wide temperature range.

The current state-of-the-art lithium ion electrode fabrication process involves several steps: mixing, slurry coating, drying, calendaring and electrode finishing. Some of these steps can be eliminated by using an extruded electrode method, incorporating the solid polymer electrolyte into the Lithium battery electrode.

The present embodiments overcome the above problems as well as provide additional advantages.

SUMMARY OF THE INVENTION

According to an aspect, a battery comprising: an anode having a first electrochemically active material; a cathode having both a second electrochemically active material and a first electrolyte; a second electrolyte interposed between the anode and the cathode; wherein at least one of the first electrolyte and second electrolyte comprises a solid polymer electrolyte; wherein the solid polymer electrolyte comprises both at least one cationic and anionic diffusing ion, wherein at least one cationic diffusing ions comprises lithium.

In the aspect, the battery the solid polymer electrolyte further comprises: a crystallinity greater than 30%; a melting temperature; a glassy state; and wherein at least one diffusing ion is mobile in the glassy state.

Further aspects of the battery can include one or more of the following:

The battery wherein the solid polymer electrolyte further comprises a plurality of charge transfer complexes.

The battery wherein the solid polymer electrolyte comprises a plurality of monomers, and wherein each charge transfer complex is positioned on a monomer.

The battery wherein the electronic conductivity of the solid polymer electrolyte is less than $1 \times 10^{-8}$ S/cm at room temperature.

The battery wherein the solid polymer electrolyte comprises: a plurality of monomers; a plurality of charge transfer complexes, wherein each charge transfer complex is positioned on a monomer; wherein the electronic conductivity of the solid polymer electrolyte is less than $1 \times 10^{-8}$ S/cm at room temperature.

The battery wherein the crystallinity of the solid polymer electrolyte is greater than 30%.

The battery wherein the solid polymer electrolyte has a glassy state which exists at temperatures below the melting temperature of the solid polymer electrolyte.

The battery wherein the solid polymer electrolyte further comprises both a cationic and anionic diffusing ion, whereby at least one diffusing ion is mobile in a glassy state of the solid polymer electrolyte, and wherein the crystallinity of the solid polymer electrolyte is greater than 30%.

The battery wherein the melting temperature of the solid polymer electrolyte is greater than 250° C.

The battery wherein the solid polymer electrolyte is a thermoplastic.

The battery wherein the ionic conductivity of the solid polymer electrolyte is isotropic.

The battery wherein the solid polymer electrolyte is non-flammable.

The battery wherein the Young's modulus of the solid polymer electrolyte is equal to or greater than 3.0 MPa.

The battery wherein the solid polymer electrolyte has a glassy state, and at least one cationic and at least one anionic diffusing ion, wherein each diffusing ion is mobile in the glassy state.

The battery wherein the ionic conductivity of the solid polymer electrolyte is greater than $1.0 \times 10^{-5}$ S/cm at room temperature.

The battery wherein the solid polymer electrolyte comprises a single cationic diffusing ion, wherein the single anionic diffusing ion comprises lithium, and wherein the diffusivity of the cationic diffusing ion is greater than $1.0 \times 10^{-12}$ m²/s at room temperature The battery wherein the solid polymer electrolyte comprises a single anionic diffusing ion, and wherein the diffusivity of the anionic diffusing ion is greater than $1.0 \times 10^{-12}$ m²/s at room temperature.

The battery wherein one of the at least cationic diffusing ion, has a diffusivity greater than $1.0 \times 10^{-12}$ m²/s.

The battery wherein one of the at least one anionic diffusing ion has a diffusivity greater than $1.0 \times 10^{-12}$ m²/s.

The battery wherein one of both the at least one anionic diffusing ion and at least one cationic diffusing ion has a diffusivity greater than $1.0 \times 10^{-12}$ m²/s.

The battery wherein the solid polymer electrolyte has an ionic conductivity greater than $1 \times 10^{-4}$ S/cm at room temperature.

The wherein the solid polymer electrolyte has an ionic conductivity greater than $1 \times 10^{-3}$ S/cm at 80° C.

The battery wherein the solid polymer electrolyte has an ionic conductivity greater than $1 \times 10^{-5}$ S/cm at −40° C.

The battery wherein the concentration of lithium is greater than 3 moles of lithium per liter of solid polymer electrolyte.

The battery wherein each at least one cationic and anionic diffusing ion have a diffusivity, wherein the cationic diffusivity is greater than the anionic diffusivity.

The battery wherein the cationic transference number of the solid polymer electrolyte is greater than 0.5 and less than 1.0.

The battery wherein at least one diffusing anion is monovalent.

The battery wherein at least one anionic diffusing ion comprises fluorine or boron.

The battery wherein the solid polymer electrolyte comprises a plurality of monomers and wherein there is at least one anionic diffusing ion per monomer.

The battery wherein the solid polymer electrolyte comprises a plurality of monomers and wherein there is at least one cationic diffusing ion per monomer.

The battery wherein there is at least one mole of the lithium per liter of solid polymer electrolyte.

The battery wherein the solid polymer electrolyte comprises a plurality of monomers, wherein each monomer comprises an aromatic or heterocyclic ring structure positioned in the backbone of the monomer.

The battery wherein the solid polymer electrolyte further includes a heteroatom incorporated in the ring structure or positioned on the backbone adjacent the ring structure.

The battery wherein the heteroatom is selected from the group consisting of sulfur, oxygen or nitrogen.

The battery wherein the heteroatom is positioned on the backbone of the monomer adjacent the ring structure.

The battery wherein the heteroatom is sulfur.

The battery wherein the solid polymer electrolyte is pi-conjugated.

The battery wherein the solid polymer electrolyte comprises a plurality of monomers, wherein the molecular weight of each monomer is greater than 100 grams/mole.

The battery wherein the charge transfer complex is formed by the reaction of a polymer, electron acceptor, and an ionic compound, wherein each cationic and anionic diffusing ion is a reaction product of the ionic compound.

The battery wherein the solid polymer electrolyte is formed from at least one ionic compound, wherein the ionic compound comprises each at least one cationic and anionic diffusing ion.

The battery wherein the charge transfer complex is formed by the reaction of a polymer and an electron acceptor.

The battery wherein the solid polymer electrolyte becomes ionically conductive after being doped by an electron acceptor in the presence of an ionic compound that either contains both a cationic and anionic diffusing ion or is convertible into both the cationic and anionic diffusing ion via reaction with the electron acceptor.

The battery wherein the solid polymer electrolyte is formed from the reaction product of a base polymer, electron acceptor and an ionic compound.

The battery wherein the base polymer is a conjugated polymer.

The battery wherein the base polymer is PPS or a liquid crystal polymer.

The battery wherein both the first and second electrolyte comprise the solid polymer electrolyte, wherein the electronic conductivity of the second electrolyte is less than $1 \times 10^{-8}$ S/cm at room temperature.

The battery wherein both the first and second electrolyte comprise the solid polymer electrolyte.

The battery wherein the anode comprises a third electrolyte, and wherein the third electrolyte comprises the solid polymer electrolyte.

The battery wherein the second electrolyte comprises the solid polymer electrolyte and is formed into a film, wherein the thickness of the film is between 200 and 15 micrometers.

The battery wherein the second electrochemically active material comprises an intercalation material.

The battery wherein the second electrochemically active material comprises a lithium oxide comprising nickel, cobalt or manganese, or a combination of two or all three of these elements.

The battery wherein the second electrochemically active material has an electrochemical potential greater than 4.2 volts relative lithium metal.

The battery wherein the cathode has an electrode potential greater than 4.2 volts relative lithium metal.

The battery wherein the second electrochemically active material is intermixed with an electrically conductive material and the solid polymer electrolyte.

The battery wherein the electrically conductive material comprises carbon.

The battery wherein the cathode comprises 70-90 percent by weight of the second electrochemically active material.

The battery wherein the cathode comprises 4-15 percent by weight of the solid polymer electrolyte.

The battery wherein the cathode comprises 2-10 percent by weight of an electrically conductive material.

The battery wherein the electrically conductive material comprises carbon.

The battery wherein the cathode is formed from a slurry.

The battery wherein the cathode is positioned on a cathode collector.

The battery wherein the second electrochemically active material comprises a lithium oxide or a lithium phosphate that contain nickel, cobalt or manganese.

The battery wherein the second electrochemically active material comprises a lithium intercalation material, wherein the lithium intercalation material comprises lithium.

The battery wherein the lithium intercalation material comprises Lithium Nickel Cobalt Aluminum Oxide; Lithium Nickel Cobalt Manganese Oxide; Lithium Iron Phosphate; Lithium Manganese Oxide; Lithium cobalt phosphate or lithium manganese nickel oxide, Lithium Cobalt Oxide, $LiTiS_2$, $LiNiO_2$, or combinations thereof.

The battery wherein the second electrochemically active material comprises an electrochemically active cathode compound that reacts with lithium in a solid state redox reaction.

The battery wherein the electrochemically active cathode material comprises a metal halide; Sulfur; Selenium; Tellurium; Iodine; $FeS_2$ or $Li_2S$.

The battery wherein the lithium intercalation material comprises Lithium Nickel Cobalt Manganese Oxide, wherein the atomic concentration of nickel in the Lithium Nickel Cobalt Manganese Oxide is greater than the atomic concentration of cobalt or manganese.

The battery wherein the cathode is about 15 to 115 micrometers in thickness.

The battery wherein the cathode coating density in the range of 1.2 to 3.6 g/cc.

The battery wherein the first electrochemically active material comprises an intercalation material.

The battery wherein the anode further comprises the solid polymer electrolyte, wherein the first electrochemically active material is mixed with the solid polymer electrolyte.

The battery wherein the first electrochemically active material comprises lithium metal.

The battery wherein the lithium metal in the anode 20 micrometers or less in thickness.

The battery further comprising an anode current collector in ionic communication with the anode, wherein lithium deposits on the anode current collector when the battery is charged.

The battery wherein the density of the lithium deposited on the anode current collector is greater than 0.4 g/cc.

The battery further comprising an anode current collector in ionic communication with the anode, wherein the electrolyte is positioned adjacent the anode current collector.

The battery wherein the first electrochemically active material comprises Silicon, Tin, antimony, lead, Cobalt, Iron, Titanium, Nickel, magnesium, aluminum, gallium, Germanium, phosphorus, arsenic, bismuth, zinc, carbon and mixtures thereof.

The battery wherein the second electrochemically active material comprises an intercalation material, wherein the first electrochemically active material comprises lithium metal.

The battery wherein the charged voltage of the battery is greater than 4.1 volts.

The battery wherein the charged voltage of the battery is greater than 4.5 volts.

The battery wherein the charged voltage of the battery is greater than 5.0 volts.

The battery wherein lithium is cycled between the anode and cathode at a rate greater than 0.5 mA/cm$^2$ at room temperature.

The battery wherein lithium is cycled between the anode and cathode at a rate greater than 1.0 mA/cm$^2$ at room temperature.

The battery wherein the lithium is cycled between the anode and cathode for greater than 150 cycles.

The battery wherein lithium is cycled between the anode and cathode at a rate greater than 3.0 mAh/cm$^2$ at room temperature for greater than ten cycles.

The battery wherein lithium is cycled between the anode and cathode at a rate greater than 18.0 mAh/cm$^2$.

The battery wherein lithium is cycled between the anode and cathode at a rate greater than 0.25 mAh/cm$^2$ at room temperature for greater than 150 cycles.

The battery further comprising an anode current collector, wherein lithium is plated onto the anode current collector when the battery is charged, wherein the density of the lithium plated onto the anode current collector is greater than 0.4 g/cc.

The battery wherein the lithium cycling efficiency is greater than 99%.

The battery wherein the second electrolyte comprises the solid polymer electrolyte and is formed into a film, and wherein the first electrolyte comprises the solid polymer electrolyte, whereby the second electrolyte is attached to the cathode.

The battery wherein the second electrolyte comprises the solid polymer electrolyte and is formed into a film, and wherein the anode comprises a third electrolyte, and wherein the third electrolyte comprises the solid polymer electrolyte, whereby the second electrolyte is attached to the anode.

In an aspect, a method of manufacturing a battery comprising the steps of: mixing a polymer with an electron acceptor to create a first mixture; heating the first mixture to form a reaction product comprising a plurality charge transfer complexes; mixing at least one ionic compound comprising lithium with the reaction product to form a solid ionically conductive polymer material.

Further aspects of the method of manufacturing a battery can include one or more of the following: The method further comprising including mixing an intercalation material with the solid ionically conductive polymer material to form a cathode.

The method wherein the cathode forming step further includes mixing an electrically conductive material with the intercalation material and the solid ionically conductive polymer material.

The method wherein the cathode forming step further comprising a calendaring step wherein the density of the cathode is increased.

The method wherein the solid ionically conductive polymer material is formed into a film to form a solid polymer electrolyte.

The method wherein the dopant is a quinone.

The method wherein the polymer is PPS, a conjugated polymer or a liquid crystal polymer.

The method wherein the ionic compound is a salt, hydroxide, oxide or other material containing lithium.

The method wherein the ionic compound comprises lithium oxide, lithium hydroxide, lithium nitrate, lithium bis-trifluoromethanesulfonimide, Lithium bis(fluorosulfonyl)imide, Lithium bis(oxalato)borate, lithium trifluoromethane sulfonate), lithium hexafluorophosphate, lithium tetrafluoroborate, or lithium hexafluoroarsenate, and combinations thereof.

The method wherein in the heating step the first mixture is heated to a temperature between 250 and 450 deg. C.

The method wherein the cathode is positioned adjacent an electrically conducting cathode current collector to form a cathode assembly.

The method wherein the solid ionically conductive polymer material is formed into a film to form a solid polymer electrolyte.

The method further comprising an electrically conducting anode current collector and an enclosure, and further comprising an assembly step wherein the solid polymer electrolyte is positioned between the anode current collector and the cathode assembly to form a battery assembly, and the battery assembly is placed within the enclosure.

The method wherein the battery further comprises a anode and a cathode, wherein the solid ionically conductive polymer material is formed into a film to form a solid polymer electrolyte, further comprising attaching the film to the anode, the cathode or both the anode and the cathode.

The method wherein in the attaching step the film is coextruded with either the anode, cathode or both the anode and the cathode.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
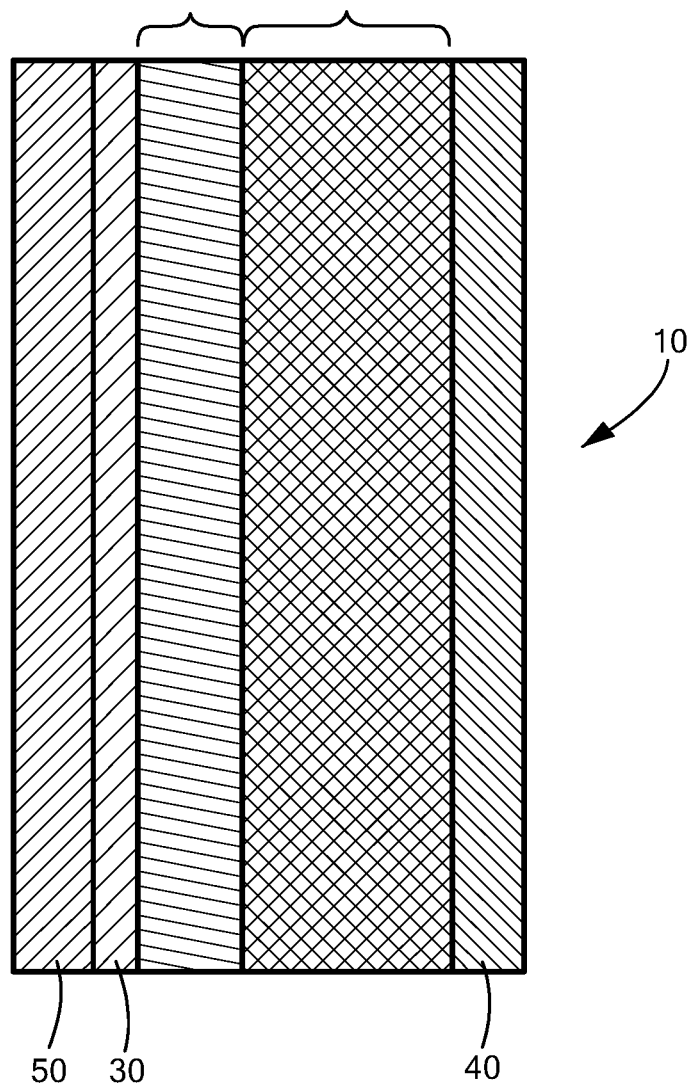
FIG. 1 is a representation of a battery cross section.

This application claims the benefit of U.S. Provisional Patent Application No. 62/170,963 filed Jun. 4, 2015, now expired, hereby incorporated by reference; international application PCTUS2016035628 filed Jun. 3, 2016, now expired, hereby incorporated by reference; and U.S. application Ser. No. 15/579,476 filed Dec. 4, 2017, which issued on Feb. 4, 2020 as U.S. Pat. No. 10,553,901, hereby incorporated by reference; and also incorporates by reference U.S. Provisional Patent Application No. 62/158,841 filed May 8, 2015, now expired; U.S. patent application Ser. No. 14/559,430 filed Dec. 3, 2014 which issued on Aug. 22, 2017 as U.S. Pat. No. 9,742,008; U.S. Provisional Patent Application No. 61/911,049 filed Dec. 3, 2013, now expired; U.S. patent application Ser. No. 13/861,170 filed Apr. 11, 2013 which issued on Nov. 4, 2017 as U.S. Pat. No. 9,819,053; and U.S. Provisional Patent Application No. 61/622,705 filed Apr. 11, 2012, now expired.

The present invention includes a lithium metal battery enabled to operate efficiently at a high voltage by a solid ionically conductive polymer material The following explanations of terms are provided to better detail the descriptions of aspects, embodiments and objects that will be set forth in this section. Unless explained or defined otherwise, all technical and scientific terms used herein have the same meaning as commonly understood to one of ordinary skill in the art to which this disclosure belongs. In order to facilitate review of the various embodiments of the disclosure, the following explanations of specific terms are provided:

A depolarizer is a synonym of electrochemically active substance, i.e., a substance which changes its oxidation state, or partakes in a formation or breaking of chemical bonds, in a charge-transfer step of an electrochemical reaction and electrochemically active material. When an electrode has more than one electroactive substances they can be referred to as codepolarizers.

Thermoplastic is a characteristic of a plastic material or polymer to become pliable or moldable above a specific temperature often around or at its melting temperature and to solidify upon cooling.

Solid electrolytes include solvent free polymers, and ceramic compounds (crystalline and glasses).

A "Solid" is characterized by the ability to keep its shape over an indefinitely long period, and is distinguished and different from a material in a liquid phase. The atomic structure of solids can be either crystalline or amorphous. Solids can be mixed with or be components in composite structures. However, for purposes of this application and its claims, a solid material requires that that material be ionically conductive through the solid and not through any solvent, gel or liquid phase, unless it is otherwise described. For purposes of this application and its claims, gelled (or wet) polymers and other materials dependent on liquids for ionic conductivity are defined as not being solid electrolytes in that they rely on a liquid phase for their ionic conductivity.

A polymer is typically organic and comprised of carbon based macromolecules, each of which have one or more type of repeating units or monomers. Polymers are light-weight, ductile, usually non-conductive and melt at relatively low temperatures. Polymers can be made into products by injection, blow and other molding processes, extrusion, pressing, stamping, three dimensional printing, machining and other plastic processes. Polymers typically have a glassy state at temperatures below the glass transition temperature Tg. This glass temperature is a function of chain flexibility, and occurs when there is enough vibrational (thermal) energy in the system to create sufficient free-volume to permit sequences of segments of the polymer macromolecule to move together as a unit. However, in the glassy state of a polymer, there is no segmental motion of the polymer.

Polymers are distinguished from ceramics which are defined as inorganic, non-metallic materials; typically compounds consisting of metals covalently bonded to oxygen, nitrogen or carbon, brittle, strong and non-conducting.

The glass transition, which occurs in some polymers, is a midpoint temperature between the supercooled liquid state and a glassy state as a polymer material is cooled. The thermodynamic measurements of the glass transition are done by measuring a physical property of the polymer, e.g. volume, enthalpy or entropy and other derivative properties as a function of temperature. The glass transition temperature is observed on such a plot as a break in the selected property (volume of enthalpy) or from a change in slope (heat capacity or thermal expansion coefficient) at the transition temperature. Upon cooling a polymer from above the Tg to below the Tg, the polymer molecular mobility slows down until the polymer reaches its glassy state.

As a polymer can comprise both amorphous and crystalline phase, polymer crystallinity is the amount of this crystalline phase relative the amount of the polymer and is represented as a percentage. Crystallinity percentage can be calculated via x-ray diffraction of the polymer by analysis of the relative areas of the amorphous and crystalline phases.

A polymer film is generally described as a thin portion of polymer, but should be understood as equal to or less than 300 micrometers thick.

It is important to note that the ionic conductivity is different from electrical conductivity. Ionic conductivity depends on ionic diffusivity, and the properties are related by the Nernst-Einstein equation. Ionic conductivity and ionic diffusivity are both measures of ionic mobility. An ionic is mobile in a material if its diffusivity in the material is positive (greater than zero), or it contributes to a positive conductivity. All such ionic mobility measurements are taken at room temperature (around 21° C.), unless otherwise stated. As ionic mobility is affected by temperature, it can be difficult to detect at low temperatures. Equipment detection limits can be a factor in determining small mobility amounts. Mobility can be understood as diffusivity of an ion at least $1\times10^{-14}$ m$^2$/s and preferably at least $1\times10^{-13}$ m$^2$/s, which both communicate an ion is mobile in a material.

A solid polymer ionically conducting material is a solid that comprises a polymer and that conducts ions as will be further described.

An aspect includes a method of synthesizing a solid ionically conductive polymer material from at least three distinct components: a polymer, a dopant and an ionic compound. The components and method of synthesis are chosen for the particular application of the material. The selection of the polymer, dopant and ionic compound may also vary based on the desired performance of the material. For example, the desired components and method of synthesis may be determined by optimization of a desired physical characteristic (e.g. ionic conductivity).

Synthesis:

The method of synthesis can also vary depending on the particular components and the desired form of the end material (e.g. film, particulate, etc.). However, the method includes the basic steps of mixing at least two of the components initially, adding the third component in an optional second mixing step, and heating the components/reactants to synthesis the solid ionically conducting polymer material in a heating step. In one aspect of the invention, the resulting mixture can be optionally formed into a film of desired size. If the dopant was not present in the mixture produced in the first step, then it can be subsequently added to the mixture while heat and optionally pressure (positive pressure or vacuum) are applied. All three components can be present and mixed and heated to complete the synthesis of the solid ionically conductive polymer material in a single step. However, this heating step can be done when in a separate step from any mixing or can completed while mixing is being done. The heating step can be performed regardless of the form of the mixture (e.g. film, particulate, etc.) In an aspect of the synthesis method, all three components are mixed and then extruded into a film. The film is heated to complete the synthesis.

When the solid ionically conductive polymer material is synthesized, a color change occurs which can be visually observed as the reactants color is a relatively light color, and the solid ionically conducting polymer material is a relatively dark or black color. It is believed that this color change occurs as charge transfer complexes are being formed, and can occur gradually or quickly depending on the synthesis method.

An aspect of the method of synthesis is mixing the base polymer, ionic compound and dopant together and heating the mixture in a second step. As the dopant can be in the gas phase, the heating step can be performed in the presence of the dopant. The mixing step can be performed in an extruder, blender, mill or other equipment typical of plastic processing. The heating step can last several hours (e.g. twenty-four (24) hours) and the color change is a reliable indication that synthesis is complete or partially complete. Additional heating past synthesis (color change) does not appear to negatively affect the material.

In an aspect of the synthesis method, the base polymer and ionic compound can be first mixed. The dopant is then mixed with the polymer-ionic compound mixture and heated. The heating can be applied to the mixture during the second mixture step or subsequent to the mixing step.

In another aspect of the synthesis method, the base polymer and the dopant are first mixed, and then heated. This heating step can be applied after the mixing or during, and produces a color change indicating the formation of the charge transfer complexes and the reaction between the dopant and the base polymer. The ionic compound is then mixed to the reacted polymer dopant material to complete the formation of the solid ionically conducting polymer material.

Typical methods of adding the dopant are known to those skilled in the art and can include vapor doping of film containing the base polymer and ionic compound and other doping methods known to those skilled in the art. Upon doping the solid polymer material becomes ionically conductive, and it is believed that he doping acts to activate the ionic components of the solid polymer material so they are diffusing ions.

Other non-reactive components can be added to the above described mixtures during the initial mixing steps, secondary mixing steps or mixing steps subsequent to heating. Such other components include but are not limited to depolarizers or electrochemically active materials such as anode or cathode active materials, electrically conductive materials such as carbons, rheological agents such as binders or extrusion aids (e.g. ethylene propylene diene monomer "EPDM"), catalysts and other components useful to achieve the desired physical properties of the mixture.

Polymers that are useful as reactants in the synthesis of the solid ionically conductive polymer material are electron donors or polymers which can be oxidized by electron acceptors. Semi-crystalline polymers with a crystallinity index greater than 30%, and greater than 50% are suitable reactant polymers. Totally crystalline polymer materials such as liquid crystal polymers ("LCPs") are also useful as reactant polymers. LCPs are totally crystalline and therefore their crystallinity index is hereby defined as 100%.

Undoped conjugated polymers and polymers such as polyphenylene sulfide ("PPS") are also suitable polymer reactants.

Polymers are typically not electrically conductive. For example, virgin PPS has electrical conductivity of $10^{-20}$ S $cm^{-1}$. Non-electrically conductive polymers are suitable reactant polymers.

In an aspect, polymers useful as reactants can possess an aromatic or heterocyclic component in the backbone of each repeating monomer group, and a heteroatom either incorporated in the heterocyclic ring or positioned along the backbone in a position adjacent the aromatic ring. The heteroatom can be located directly on the backbone or bonded to a carbon atom which is positioned directly on the backbone. In both cases where the heteroatom is located on the backbone or bonded to a carbon atom positioned on the backbone, the backbone atom is positioned on the backbone adjacent to an aromatic ring. Non-limiting examples of the polymers used in this aspect of the invention can be selected from the group including PPS, Poly(p-phenylene oxide) ("PPO"), LCPs, Polyether ether ketone ("PEEK"), Polyphthalamide ("PPA"), Polypyrrole, Polyaniline, and Polysulfone. Co-polymers including monomers of the listed polymers and mixtures of these polymers may also be used. For example, copolymers of p-hydroxybenzoic acid can be appropriate liquid crystal polymer base polymers.

Table 1 details non-limiting examples of reactant polymers useful in the synthesis of the solid ionically conductive polymer material along with monomer structure and some physical property information which should be considered also non-limiting as polymers can take multiple forms which can affect their physical properties.

TABLE 1

| Polymer | Monomer Structure | Melting Pt. (C.) | MW |
|---|---|---|---|
| PPS polyphenylene sulfide | 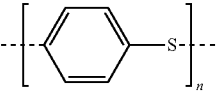 | 285 | 109 |

TABLE 1-continued

| Polymer | Monomer Structure | Melting Pt. (C.) | MW |
|---|---|---|---|
| PPO Poly(p-phenylene oxide) | | 262 | 92 |
| PEEK Polyether ether ketone | | 335 | 288 |
| PPA Polyphthalamide | | 312 | |
| Polypyrrole | | | |
| Polyaniline Poly-Phenylamine [C$_6$H$_4$NH]$_n$ | | 385 | 442 |
| Polysulfone | | | 240 |
| Xydar (LCP) | | | |
| Vectran Poly-paraphenylene terephthalamide [—CO—C$_6$H$_4$—CO—NH—C$_6$H$_4$—NH—]$_n$ | | | |
| Polyvinylidene fluoride (PVDF) | | 177° C. | |
| Polyacrylonitrile (PAN) | | 300° C. | |
| Polytetrafluoro-ethylene (PTFE) | | 327 | |

TABLE 1-continued

| Polymer | Monomer Structure | Melting Pt. (C.) | MW |
|---|---|---|---|
| Polyethylene (PE) | $\left(\begin{array}{cc} H & H \\ | & | \\ C-C \\ | & | \\ H & H \end{array}\right)_n$ | 115-135 | |

Dopants that are useful as reactants in the synthesis of the solid ionically conductive polymer material are electron acceptors or oxidants. It is believed that the dopant acts to release ions for ionic transport and mobility, and it is believed to create a site analogous to a charge transfer complex or site within the polymer to allow for ionic conductivity. Non-limiting examples of useful dopants are quinones such as: 2,3-dicyano-5,6-dichlorodicyanoquinone ($C_8Cl_2N_2O_2$) also known as "DDQ", and tetrachloro-1,4-benzoquinone ($C_6Cl_4O_2$), also known as chloranil, tetracyanoethylene ($C_6N_4$) also known as TCNE, sulfur trioxide ("$SO_3$"), ozone (trioxygen or $O_3$), oxygen ($O_2$, including air), transition metal oxides including manganese dioxide ("$MnO_2$"), or any suitable electron acceptor, etc. and combinations thereof. Dopants that are temperature stable at the temperatures of the synthesis heating step are useful, and quinones and other dopants which are both temperature stable and strong oxidizers quinones are very useful. Table 2 provides a non-limiting listing of dopants, along with their chemical diagrams.

TABLE 2

| Dopant | Formula | Structure |
|---|---|---|
| 2,3-Dichloro-5,6-dicyano-1,4-benzoquinone (DDQ) | $C_6Cl_2(CN)_2O_2$ | |
| tetrachloro-1,4-benzoquinone (chloranil) | $C_6Cl_4O_2$ | |
| Tetracyanoethylene (TCNE) | $C_6N_4$ | |
| Sulfur Trioxide | $SO_3$ | |
| Ozone | $O_3$ | |
| Oxygen | $O_2$ | |
| Transition Metal Oxides | $M_xO_y$ (M = Transition Metal, x and y are equal to or greater than 1) | |

Ionic compounds that are useful as reactants in the synthesis of the solid ionically conductive polymer material are compounds that release desired lithium ions during the synthesis of the solid ionically conductive polymer material. The ionic compound is distinct from the dopant in that both an ionic compound and a dopant are required. Non-limiting examples include $Li_2O$, LiOH, $LiNO_3$, LiTFSI (lithium bis-trifluoromethanesulfonimide), LiFSI (Lithium bis(fluorosulfonyl)imide), Lithium bis(oxalato)borate (LiB($C_2O_4$)$_2$ "LiBOB"), lithium triflate LiCF$_3$O$_3$S (lithium trifluoromethane sulfonate), LiPF6 (lithium hexafluorophosphate), LiBF4 (lithium tetrafluoroborate), LiAsF6 (lithium hexafluoroarsenate) and other lithium salts and combinations thereof. Hydrated forms (e.g. monohydride) of these compounds can be used to simplify handling of the compounds. Inorganic oxides, chlorides and hydroxide are suitable ionic compounds in that they dissociate during synthesis to create at least one anionic and cationic diffusing ion. Any such ionic compound that dissociates to create at least one anionic and cationic diffusing ion would similarly be suitable. Multiple ionic compounds can also be useful that result in multiple anionic and cationic diffusing ions can be preferred. The particular ionic compound included in the synthesis depends on the utility desired for the material. For example, in an aspect where it would be desired to have a lithium cation, a lithium hydroxide, or a lithium oxide convertible to a lithium and hydroxide ion would be appropriate. As would be any lithium containing compound that releases both a lithium cathode and a diffusing anion during synthesis. A non-limiting group of such lithium ionic compounds includes those used as lithium salts in organic solvents.

The purity of the materials is potentially important so as to prevent any unintended side reactions and to maximize the effectiveness of the synthesis reaction to produce a highly conductive material. Substantially pure reactants with generally high purities of the dopant, base polymer and the ionic compound are useful, and purities greater than 98% are more useful with even higher purities, e.g. LiOH: 99.6%, DDQ: >98%, and Chloranil: >99% also useful.

To further describe the utility of the solid ionically conductive polymer material and the versatility of the above described method of the synthesis of the solid ionically conductive polymer material, use of the solid ionically conductive polymer material in certain aspects of lithium metal electrochemical applications are described:

Referring to FIG. 1 there is shown the battery 10 of an aspect in a cross sectional view. The battery includes both a cathode 20 and an anode 30. The cathode is positioned adjacent or is attached to a cathode current collector 40 which can act to conduct electrons to the cathode. The anode 30 is similarly positioned adjacent or is attached to an anode current collector 50 which also acts to conduct electrons from the anode to an external load. Interposed between the anode 30 and the cathode 20 is the solid polymer electrolyte 60 which acts both as a dielectric layer preventing electrical conduction and internal shorts between the anode and cathode while ionically conducting ions between the anode and cathode.

The described battery components are similar to typical battery components however the solid polymer electrolyte and its combination with each battery component is further described in aspects of the lithium cell.

The anode current collector 50 is electrically conducting and positioned adjacent the solid polymer electrolyte film 60. Interposed between the anode current collector and the solid polymer electrolyte is an anode which can comprise any of the multiple typical lithium intercalation materials or lithium metal. Upon charge the solid polymer electrolyte acts to conduct lithium metal to the anode, and to the lithium intercalation material in an aspect, or to the anode current collector if lithium metal is used. In the aspect of a lithium metal anode excess lithium can be added to the cell and is maintained at the anode collector and can act as a deposition surface upon cell charging.

In the aspect when an anode intercalation material is used as the anode electrochemically active material, useful anode materials include typical anode intercalation materials comprising: lithium titanium oxide (LTO), Silicon (Si), germanium (Ge), and tin (Sn) anodes doped and undoped; and other elements, such as antimony (Sb), lead (Pb), Cobalt (Co), Iron (Fe), Titanium (Ti), Nickel (Ni), magnesium (Mg), aluminum (Al), gallium (Ga), Germanium (Ge), phosphorus (P), arsenic (As), bismuth (Bi), and zinc (Zn) doped and undoped; oxides, nitrides, phosphides, and hydrides of the foregoing; and carbons (C) including nanostructured carbon, graphite, graphene and other materials including carbon, and mixtures thereof. In this aspect the anode intercalation material can be mixed with and dispersed within the solid ionically conducting polymer material such that the solid ionically conducting polymer material can act to ionically conduct the lithium ions to and from the intercalation material during both intercalation and deintercalation (or lithiation/delithiation).

In the aspect when lithium metal is used, the lithium can be added with the cathode material, added to the anode as lithium foil, dispersed in the solid ionically conducting polymer material, or added to both battery components.

The solid polymer electrolyte acts to transport the lithium metal to and from the anode and therefore must be positioned within the battery so it is enabled to do so. Thus the solid polymer electrolyte can be positioned as a film layer in a planar or jellyroll battery construction, a convolute positioned around the anode current collector, or any other shape which enables the solid polymer electrolyte to perform its lithium ion conduction. The thickness of the solid polymer electrolyte can be in a desired range of uniform thicknesses such as 200 to 25 micrometers or thinner. To aid in extrusion of the solid polymer electrolyte, a rheological or extrusion aid can be added such as EPDM (ethylene propylene diene monomer) in amounts necessary to affect the desired extrusion properties.

The cathode current collector 40 is also a typical aluminum or other electrically conducting film onto which the cathode 20 can be located or positioned.

Typical electrochemically active cathode compounds which can be used include but are not limited to: NCA—Lithium Nickel Cobalt Aluminum Oxide ($LiNiCoAlO_2$); NCM (NMC)—Lithium Nickel Cobalt Manganese Oxide ($LiNiCoMnO_2$); LFP—Lithium Iron Phosphate ($LiFePO_4$); LMO—Lithium Manganese Oxide ($LiMn_2O_4$); LCO—Lithium Cobalt Oxide ($LiCoO_2$); lithium oxides tor phosphates that contain nickel, cobalt or manganese, and LiTiS2, LiNiO2, and other layered materials, other spinels, other olivines and tavorites, and combinations thereof. In an aspect, the electrochemically active cathode compounds can be an intercalation material or a cathode material that reacts with the lithium in a solid state redox reaction. Such conversion cathode materials include: metal halides including but not limited to metal fluorides such as $FeF_2$, $BiF_3$, $CuF_2$, and $NiF_2$, and metal chlorides including but not limited to $FeCl_3$, $FeCl_2$, $CoCl_2$, $NiCl_2$, $CuCl_2$, and AgCl; Sulfur (S); Selenium (Se); Tellerium (Te); Iodine (I); Oxygen (O); and related materials such as but not limited to pyrite ($FeS_2$) and $Li_2S$. As the solid polymer electrolyte is stable at high voltages (exceeding 5.0V relative the anode electrochemically active material), an aspect is to increase the energy density by enabling as high a voltage battery as possible, therefore high voltage cathode compounds are preferred in this aspect. Certain NCM or NMC material can provide such high voltages with high concentrations of the nickel atom. In an aspect, NCMs that have an atomic percentage of nickel which is greater than that of cobalt or manganese, such as $NCM_{523}$, $NCM_{712}$, $NCM_{721}$, $NCM_{811}$, $NCM_{532}$, and $NCM_{523}$, are useful to provide a higher voltage relative the anode electrochemically active material.

EXAMPLES

The battery article and its components are described here, and ways to make and use them are illustrated in the following examples.

Example 1

PPS and chloranil powder are mixed in a 4.2:1 molar ratio (base polymer monomer to dopant ratio greater than 1:1). The mixture is then heated in argon or air at a temperature up to 350° C. for about twenty-four (24) hours at atmospheric pressure. A color change is observed confirming the creation of charge transfer complexes in the polymer-dopant reaction mixture. The reaction mixture is then reground to a small average particle size between 1-40 micrometers. LiTFSI powder (12 wt. % of total mixture) is then mixed with the reaction mixture to create the synthesized solid, ionically conducting polymer material. The solid, ionically conducting polymer material which is used as a solid polymer electrolyte in this aspect is referred to as a solid polymer electrolyte when thus used.

The solid polymer electrolyte can be used in multiple locations in a battery, including in an electrode, or as a standalone dielectric, non-electrochemically active electrolyte interposed between electrodes. When so used, the solid polymer electrolyte can be the same material in all battery application, and in the aspect of a lithium battery if the ionic mobility of lithium is maximized, this property and attribute of the solid polymer electrolyte allows the solid polymer electrolyte to function well in an anode, cathode and as a standalone dielectric, non-electrochemically active electrolyte interposed between anode and cathode electrodes. However, in an aspect, the solid polymer electrolyte can vary so as to accommodate different properties that may be desired in an application. In a non-limiting example, an electronically conductive material could be added to the solid polymer electrolyte or integrated into the solid polymer electrolyte during its synthesis thus increasing the electrical conductivity of the solid polymer electrolyte and making it suitable for use in an electrode and reducing and or eliminating the need for additional electrical conductive additives in such an electrode. If so used, such a formulation would not be appropriate for use as a standalone dielectric, non-electrochemically active electrolyte interposed between anode and cathode electrodes as it is electrically conductive and would act to short the battery.

Further, use of the solid polymer electrolyte in an anode, cathode and as a standalone dielectric, non-electrochemically active electrolyte interposed between anode and cathode electrodes enables a battery designer to take advantage of the thermoplastic nature of the solid polymer electrolyte. The standalone dielectric, non-electrochemically active electrolyte can be thermoformed onto the anode or cathode by being heated and fixed thereto, such as in a lamination process, or by being co-extruded and thus formed together with the electrode. In an aspect all three battery components include the solid polymer electrolyte and are thermoformed together or coextruded to form a battery.

Electronic conductivity of the synthesized material is measured using potentiostatic method between blocking electrodes, and was determined to be $6.5 \times 10^{-9}$ S/cm or less than $1 \times 10^{-8}$ S/cm.

Diffusivity measurements were conducted on the synthesized material. PGSE-NMR measurements were made using a Varian-S Direct Drive 300 (7.1 T) spectrometer. Magic angle spinning technique was used to average out chemical shift anisotropy and dipolar interaction. Pulsed gradient spin stimulated echo pulse sequence was used for the self-diffusion (diffusivity) measurements. The measurements of the self-diffusion coefficients for the cation and anion in each material sample were made using $^1H$ and $^7Li$ nuclei, respectively. The material cation diffusivity D ($^7Li$) of $0.23 \times 10^{-9}$ m$^2$/s at room temperature, and the anion diffusivity D ($^1H$) of was $0.45 \times 10$ m$^2$/s at room temperature.

In order to determine the degree of ion association which would decrease the conductivity of the material, the conductivity of the material is calculated via the Nernst-Einstein equation, using the measured diffusion measurements, it was determined the associated calculated conductivity to be much greater than the measured conductivity. The difference was on average at least an order of magnitude (or 10×). Therefore, it is believed that conductivity can be improved by improving ion dissociation, and the calculated conductivities can be considered within the range of conductivity.

The cation transference number can be estimated via equation (1) from the diffusion coefficient data as:

$$t+ \sim D+/(D++D-) \quad (1)$$

where D+ and D− refer to the diffusion coefficients of the Li cation and TFSI anion, respectively. From the above data, one obtains a t+ value of about 0.7 in the solid ionically conductive polymer material. This property of high cation transference number has important implications to battery performance. Ideally one would prefer a t+ value of 1.0, meaning that the Li ions carry all the electric current. Anion mobility results in electrode polarization effects which can limit battery performance. The calculated transference number of 0.7 is not believed to have been observed in any liquid or PEO based electrolyte. Although ion association may affect the calculation, electrochemical results confirm the transference number range of between 0.65 and 0.75.

It is believed that the t+ is dependent on anion diffusion as lithium cation diffusion is high. As the cation diffusion is greater than the corresponding anion diffusion the cation transference number is always above 0.5, and as the anion is mobile the cation transference number must also be less than 1.0. It is believed that a survey of lithium salts as ionic compounds would produce this range of cation transference numbers greater than 0.5 and less than 1.0. As a comparative example, some ceramics have been reported to have high diffusion numbers, however such ceramics only transport a single ion, therefore the cation transference number reduces to 1.0 as the D− is zero.

Example 2

Lithium cobalt oxide (LiCoO$_2$)("LCO") cathodes were prepared containing the synthesized material from Example 1. The cathodes used a loading of 70% LCO by weight which is mixed with the solid ionically conductive polymer material and an electrically conducting carbon. Cells were prepared using lithium metal anodes, porous polypropylene separator and a standard Li-ion liquid electrolyte composed of LiPF$_6$ salt and carbonate-based solvents. The cells were assembled in a dry glovebox and cycle tested.

Figure 2:
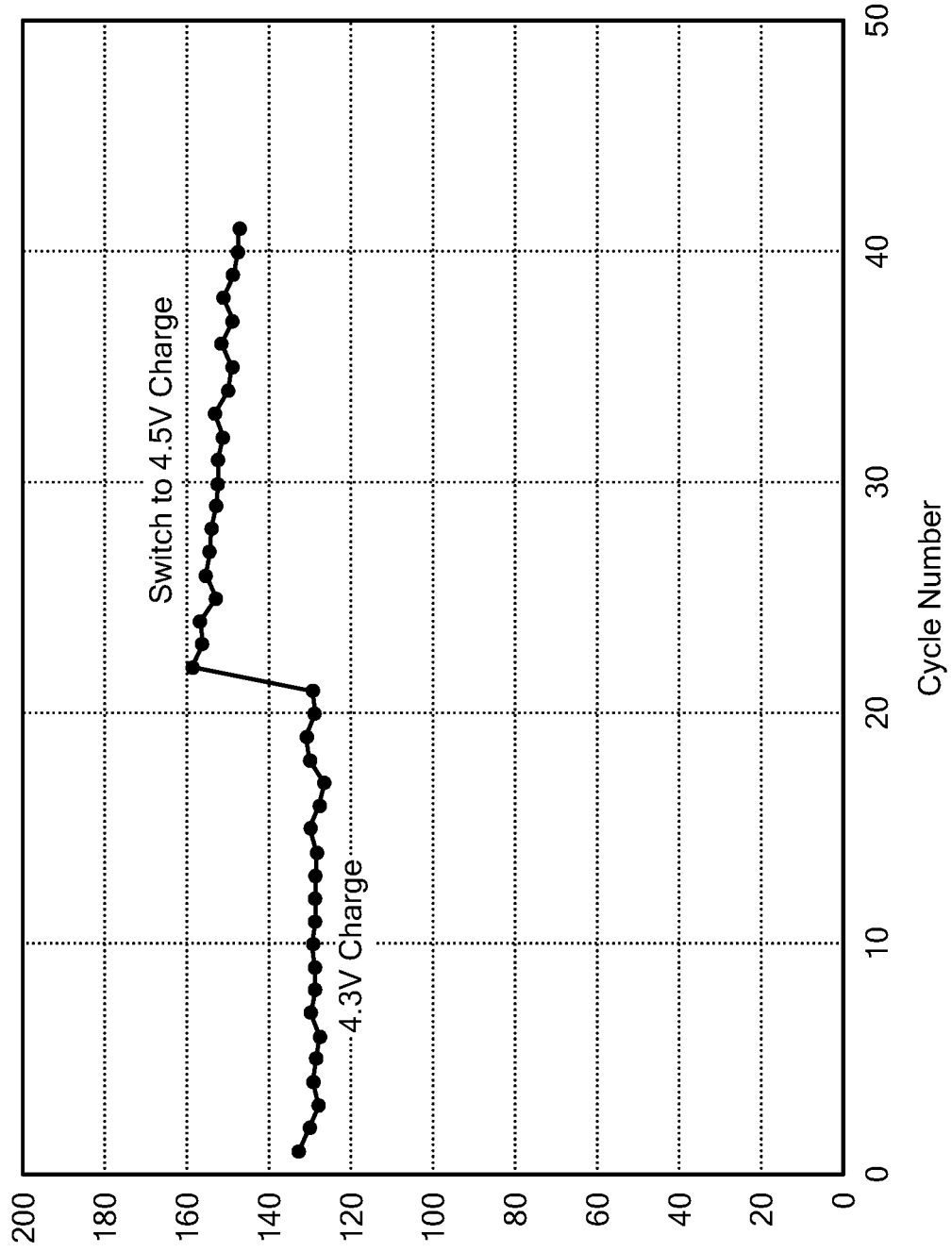
FIG. 2 is a plot of a capacity-voltage (CV) curve of a battery described in Example 2, which is cycled at two different voltages.

The capacity in terms of the weight in grams of LCO used in these cells is displayed in FIG. 2. It can be seen that the capacity was stable when charged to 4.3 V, and consistent with the target of 0.5 equivalents of Li removed from the cathode during charging. The cell was also cycled to a higher charge voltage of 4.5V, which utilizes a higher percentage of lithium from the cathode, and resulted in the high capacity of >140 mAh/g. The slight drop in capacity with cycle number observed for the 4.5V charge tests is consistent with decomposition (i.e. non-stable) of the liquid electrolyte at this higher voltage. Overall, the performance of the LCO cathode containing the material of the present invention is favorably comparable to a slurry coated LCO cathode.

Example 3

Additional solid ionically conductive polymer materials are listing in Table 3, along with the material synthesized and described in Example 1 (PPS-Chloranil-LiTFSI), which were prepared using the synthesis method of Example 1, along with their reactants and associated ionic conductivity (EIS method) at room temperature.

TABLE 3

| Polymer (base) | Dopant | Ionic Compound (Wt %) | | | Ionic Conductivity (S/cm) |
|---|---|---|---|---|---|
| PPS | Chloranil | LiTFSI (12) | | | 6.0E-04 |
| PPS | Chloranil | LiTFSI (4) | | LiBOB(1) | 2.2E-04 |
| PPS | Chloranil | LiTFSI (10) | | LiBOB(1) | 7.3E-04 |
| PPS | Chloranil | LiTFSI (10) | | LiBOB(1) | 5.7E-04 |
| PPS | Chloranil | | LiFSI (10) | LiBOB(1) | 8.8E-04 |
| PPS | Chloranil | LiTFSI (5) | LiFSI (5) | LiBOB(1) | 1.3E-03 |

Various physical properties of the solid ionically conductive polymer materials are measured and it is determined that the solid ionically conductive polymer materials: the electronic area specific resistance is greater than $1 \times 10^5$ Ohm-cm$^2$; can be molded to thicknesses from 200 micrometers down to 20 micrometers; possesses significant ionic mobility to very low temperatures, e.g. −40° C., and have ionic conductivities at room temperature greater than 1.0E-05 S/cm, 1.0E-04 S/cm, and 1.0E-03 S/cm, and these ionic conductivities include lithium as one of the mobile ions being conducted through the solid ionically conductive polymer material.

Example 4

Figure 3:
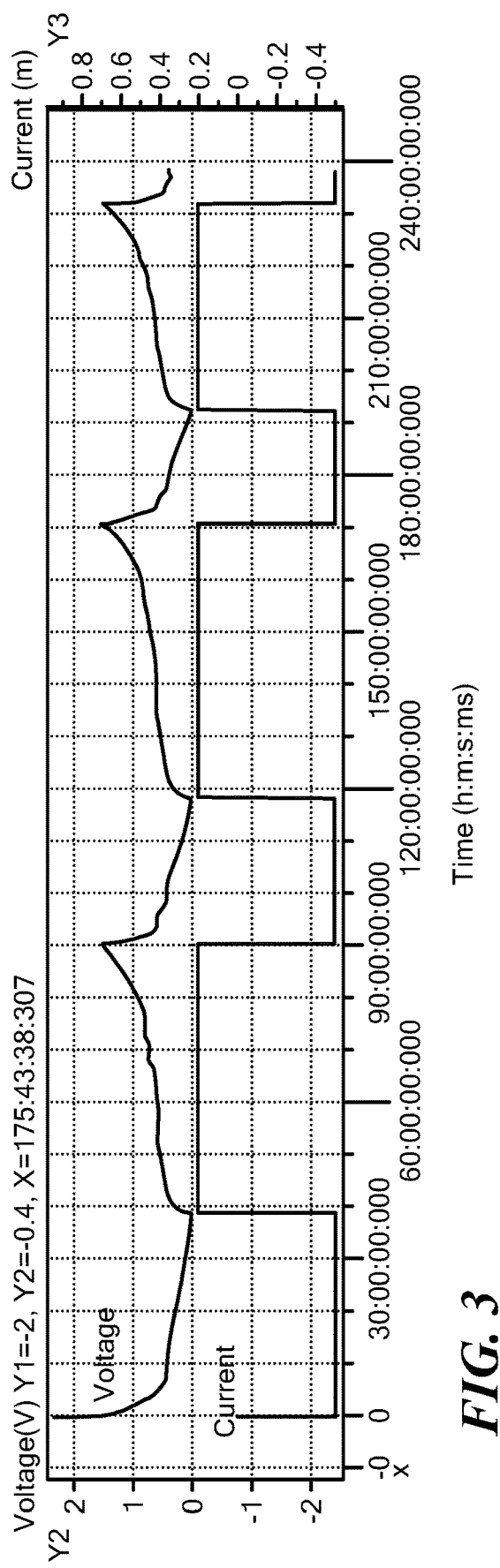
FIG. 3 is cycle plot of a battery described in Example 4.
Figure 4:
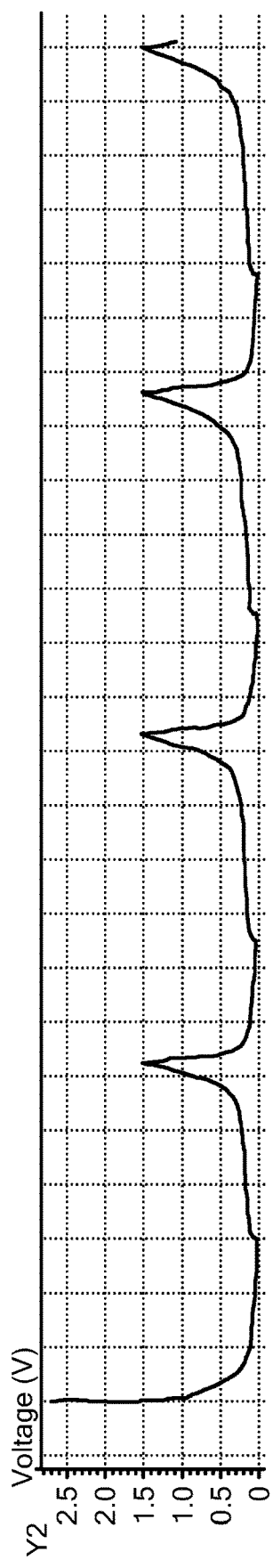
FIG. 4 is cycle plot of a battery described in Example 4.

To demonstrate the ability of the solid polymer electrolyte to be combined with a lithium ion electrochemically active material, anodes were prepared with materials such as graphite (meso-carbon micro beads), silicon, tin, and lithium titanate ($Li_4Ti_5O_{12}$, LTO). These materials were chosen for evaluation since they are currently either being used in commercially available Li-ion cells, or are actively being researched for application to Li-ion anodes. In each case, solid polymer electrolyte material was added to the active anode material and an anode was prepared. These anodes were then tested by cycling versus a lithium metal anode with polypropylene separator and standard liquid electrolyte. Results of this testing are presented in FIGS. 3 and 4. FIG. 3 displays a cycle test of a Tin anode combined with the solid polymer electrolyte. The Li/Sn and solid polymer electrolyte coin cell is discharged at a constant current of 0.5 mA, and charged at a constant current of 0.2 mA. FIG. 4 displays a cycle test of a Graphite anode combined with the solid polymer electrolyte. The Li/Graphite and solid polymer electrolyte coin cell is discharged at a constant current of 0.5 mA, and charged at a constant current of 0.2 mA.

In each case, the solid polymer electrolyte was found to be compatible with the anode materials and demonstrates the utility of the solid polymer electrolyte in preparing both cathodes and anodes for lithium ion cells. Furthermore, the solid polymer electrolyte has been shown to be stable either as a stand-alone ionically conductive electrolyte and separator, or in combination with standard Li-ion separator and liquid electrolyte. This flexibility in cell design provides an advantage to battery manufacturers where the battery chemistry, design and overall cell performance can be tailored to meet specific device requirements.

Example 5

To demonstrate the solid polymer electrolyte is stable at and can enable high voltage batteries, coin cells were constructed using lithium metal anodes. The solid polymer electrolyte is cut into a disk to completely cover a lithium metal disk, and a titanium metal disk is used as a blocking electrode. The coin cell of this Li/ solid polymer electrolyte ("SPE")/Ti construction was prepared in an Argon-filled glovebox with very low water content, to prevent the reaction of the lithium electrode with moisture.

The Li/SPE/Ti coin cell was then placed on cyclic voltammetry (CV) test, where the voltage of the cell is varied at a constant scan rate (in this case, 2 mV/sec) between set voltage limits of –0.5V and 5.5V. The current is measured for the cell and plotted as a function of the voltage, as displayed in FIG. 5, which displays cyclic voltammetry of the Li/SPE/Ti cell, at a scan rate of 2 mV/sec, cycled between the voltage limits of –0.5 V and 5.5 V. This test is useful to simulate the use of the SPE in a high voltage cell in which the charged battery voltage extends upwards greater than 4.2 V and up to at least 5.5V.

Figure 5:
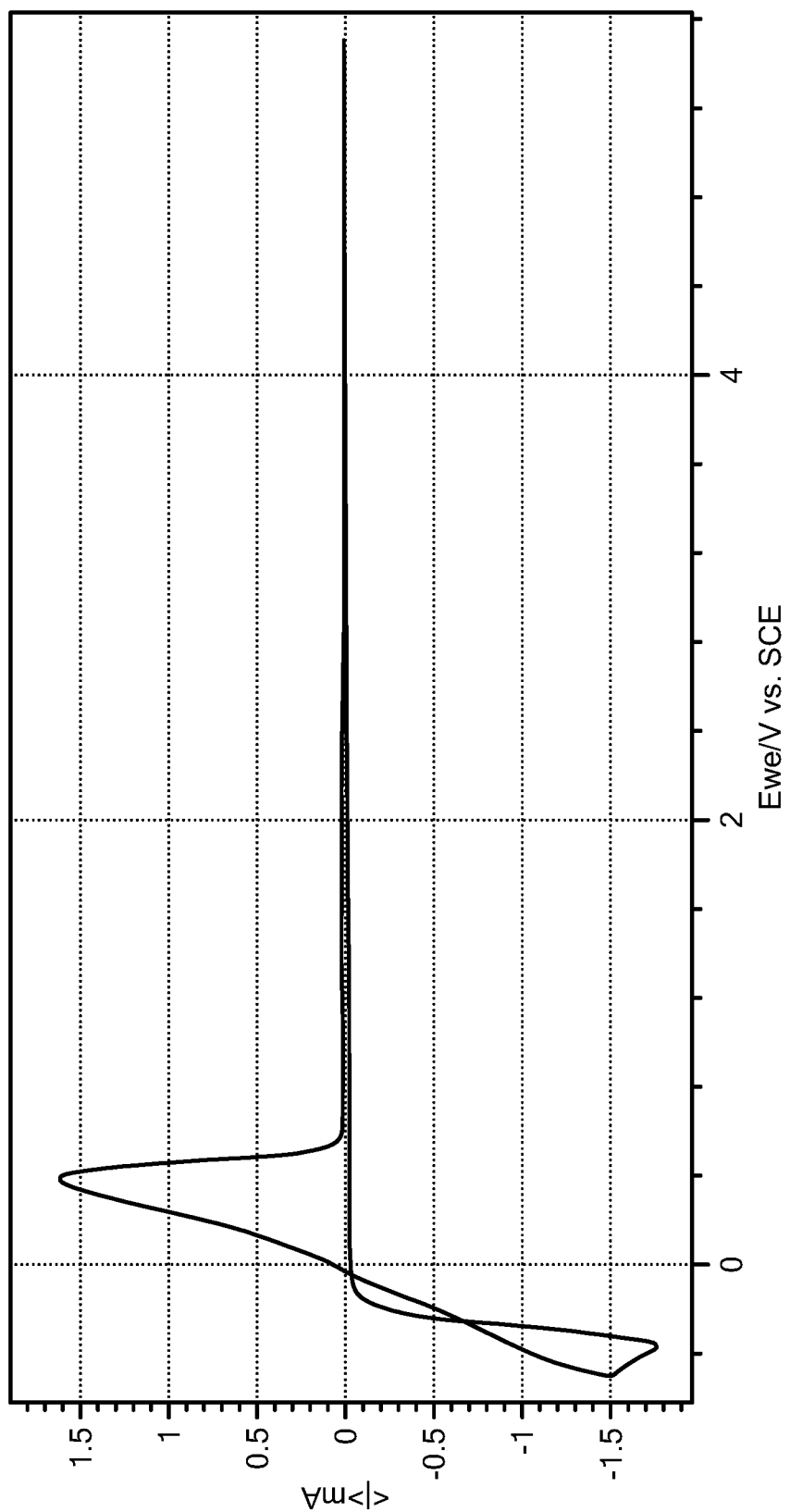
FIG. 5 is cyclic voltammetry plot of a battery described in Example 5.

As can be seen in the cyclic voltammetry curve in FIG. 5, there are strong anodic and cathodic waves, near 0 V, which are attributed to the plating and stripping of lithium metal. Below 0 V, the negative current indicates that lithium metal is plating onto the stainless steel disk. Slightly above 0 V, the positive current is due to the stripping-off of lithium metal from the stainless steel disk. These waves are very important in that they demonstrate the ability of the solid polymer electrolyte to transfer lithium ions through the electrolyte, which is necessary for the operation of any lithium anode secondary battery. Just as important as the Li plating and stripping waves, is the absence of other waves in the CV curve. This test demonstrates that the polymer electrolyte is stable within this voltage window (up to or exceeding 5.5 V) and would be similarly stable in a battery where the charged or operating voltage extends to 5.5V or greater.

Typical Lithium ion ("Li-Ion") batteries are limited in voltage range by the liquid electrolytes used in these systems. Li-ion electrolytes typically containing carbonate-based solvents, for example: propylene carbonate, ethylene carbonate, dimethyl carbonate, diethyl carbonate, ethyl methyl carbonate, etc., limit the positive voltage of the battery. Typically, batteries of this nature can only be charged to 4.3 V, because the liquid electrolyte starts to oxidize and decompose above this potential. The use of the solid polymer electrolyte in lithium-based batteries enables charging to a higher voltage, which in turn will increase the amount of energy stored in the battery and lead to longer battery run-time. Charging to a higher voltage will also enable the use of higher voltage cathodes, such as lithium cobalt phosphate, NCM and other new cathode materials for lithium ion cells that have electrochemical potentials relative lithium metal greater than 4.3V. The research on these new high voltage cathodes has been hindered by a lack of stable electrolytes at voltages greater than 4.3 V. The solid polymer electrolyte solves this problem by providing a lithium ion conductive electrolyte which is stable at high voltages.

Comparative Example 6

Figure 6:
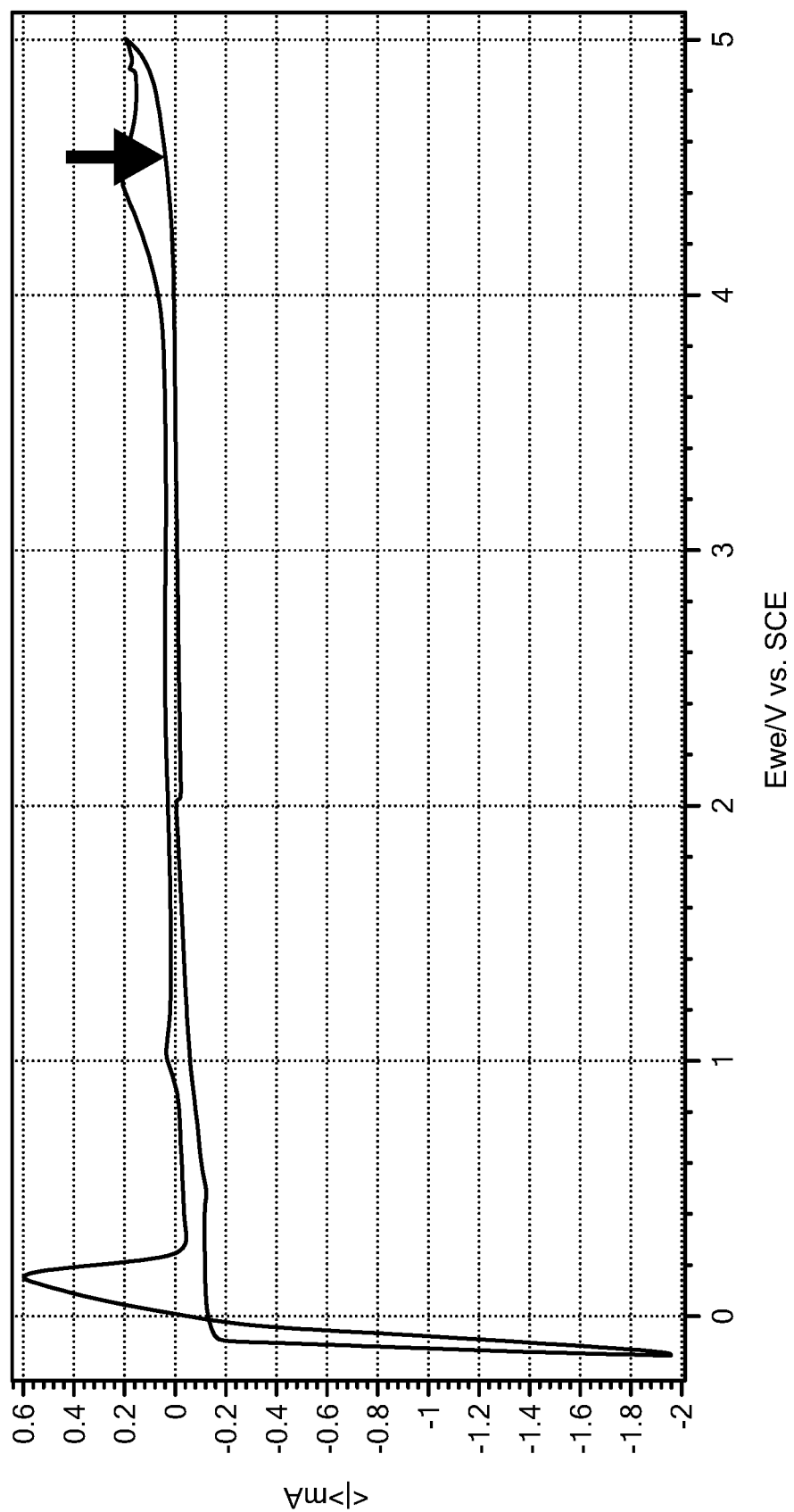
FIG. 6 is cyclic voltammetry plot of a comparative battery described in Example 6.

As a comparison to the cyclic voltammetry displayed in FIG. 5, a Current-Voltage ("CV") curve was measured for a Li/Stainless Steel cell containing liquid electrolyte (EC-DMC-DEC and VC with $LiPF_6$ salt) and a polypropylene separator (from Celgard). The curve is displayed in FIG. 6.

As can be seen in the CV curve for the liquid electrolyte comparison example, a cathodic peak appears on the positive scan (as indicated by the arrow) which is attributed to the decomposition of the liquid electrolyte at a voltage above 4 V. This comparison shows that the liquid electrolyte is prone to decomposition, while the polymer electrolyte is stable at high voltage and does not decompose, as illustrated in Example 5.

Example 7

Figure 7:
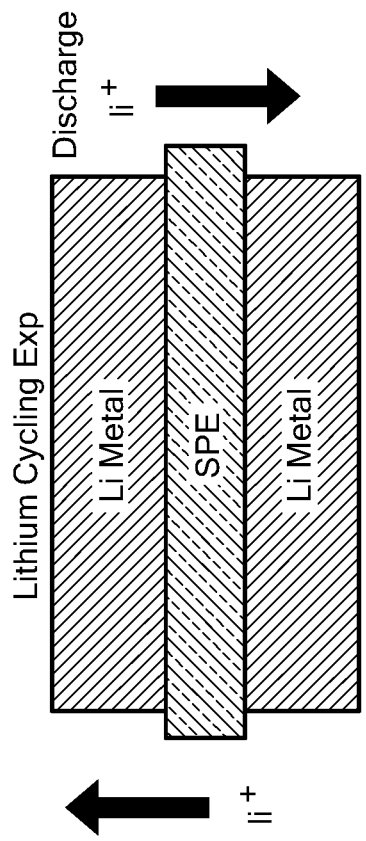
FIG. 7 is a representation of a test fixture cross section described in Example 7.
Figure 8:
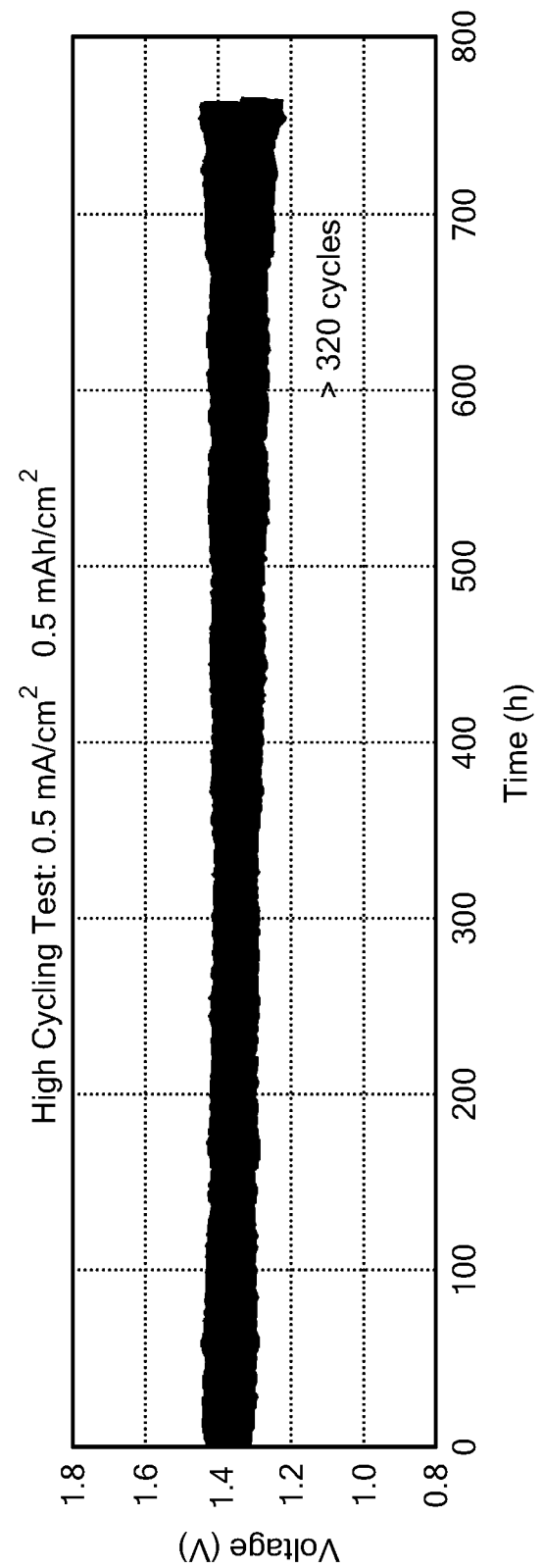
FIG. 8 is cycle plot of a battery described in Example 7.

Referring to FIG. 7, there is shown a test battery with the solid polymer electrolyte interposed between two strips of lithium metal. The Li/ solid polymer electrolyte /Li cells were constructed in an inert atmosphere and lithium was transferred by applying constant current to the cell for a period of time (in this example, the period of time was 1 h). The current was then reversed and the lithium was transferred in the opposite direction. FIG. 8 shows a plot of the voltage V relative time of a cell with >320 charge-discharge cycles, using a current density of 0.5 mA/cm² and tested at room temperature. In this example, the current is held constant and the voltage is measured, as can be seen on the y-axis of FIG. 8. The voltage displayed by the cell during the constant current test depends on the polarization of the cell, which is related to the overall resistance of the cell (i.e. the higher the resistance of the cell, the larger the change in voltage, or higher polarization). The overall resistance of the cell is due to the bulk resistance of the solid polymer electrolyte plus the interfacial resistance of the polymer electrolyte in contact with the lithium metal surfaces. The FIG. 8 plot shows that the polarization of the cell is relatively constant for the entire test. The results of this test further demonstrates the stability of the polymer electrolyte, where 1565 microns of lithium were transferred over the entire test, and the lithium metal electrodes were only about 85 microns in thickness to begin. These results demonstrate that the solid polymer electrolyte has the capability to transfer large amounts of lithium with high stability. FIG. 8 plot voltage is above 1.0 V as the cell is put in series with a NiMH cell during testing.

Example 8

Figure 9:
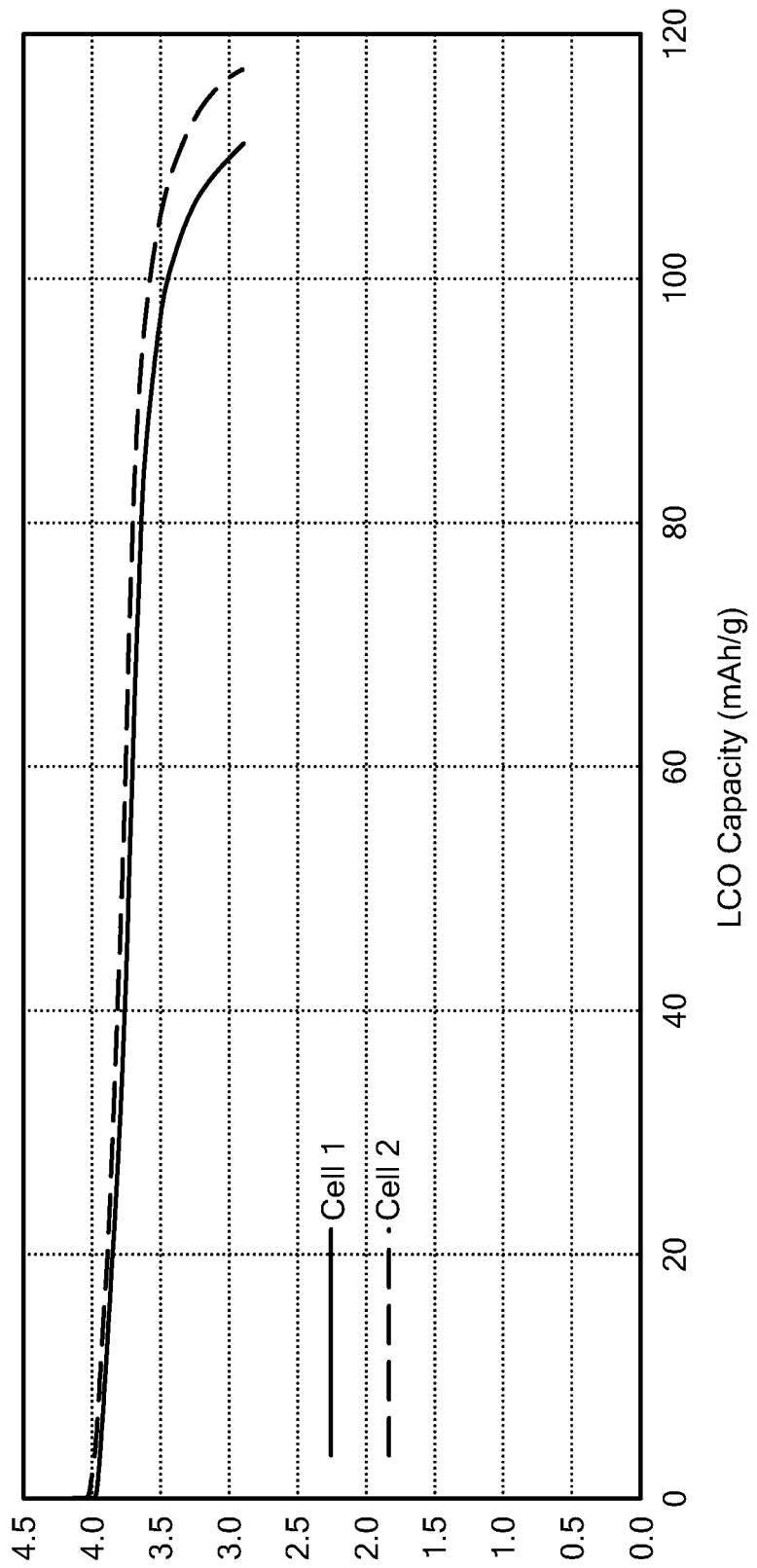
FIG. 9 is electrochemical impedance spectroscopy (EIS) plot of a battery described in Example 8.

To demonstrate the utility of the solid polymer electrolyte in high voltage batteries, cells were constructed using lithium metal anodes (20 micrometers or less in thickness), solid polymer electrolyte and lithium cobalt oxide cathodes containing the solid polymer electrolyte. The lithium cobalt oxide, $LiCoO_2$ ("LCO"), is used since this is a high voltage cathode material with a charged voltage over 4 V. The use of lithium metal anodes increases the energy density of the battery, since lithium metal has much higher capacity than a lithiated graphite electrode that is typically used in a Li-ion battery. The theoretical capacity of lithiated graphite is 372 mAh/g, while lithium metal has a capacity of 3860 mAh/g—more than ten times the capacity of graphite anodes. Coin cells of the Li/SPE/LCO configuration were cycle tested and demonstrated good performance, as displayed in FIG. 9, which shows electrochemical impedance spectroscopy (EIS) of the bipolar Li/SPE/Li Battery. FIG. 9 shows the EIS initially, the EIS after 1 month of storage, after 2 months of storage, and after 3 months of storage.

The capacity of the $LiCoO_2$ used in these cells was 134 mAh/g, which corresponds to the target 0.5 equivalents of Li removed from the cathode during charging. The cycling efficiency for lithium was found to be over 99%, which matches or exceeds that found for liquid electrolyte systems. Cycling efficiency is calculated by counting coulombs over a single cycle and comparing the charge and discharge cycles to calculate the efficiency ((charge out/charge into battery) times 100). Overall, these results demonstrate the function of the solid polymer electrolyte as an electrolyte for high voltage lithium-based battery systems.

The density of the lithium deposited onto the anode current collector during battery charging was measured and determined to be greater than 0.4 g/cc.

Example 9

Figure 10:
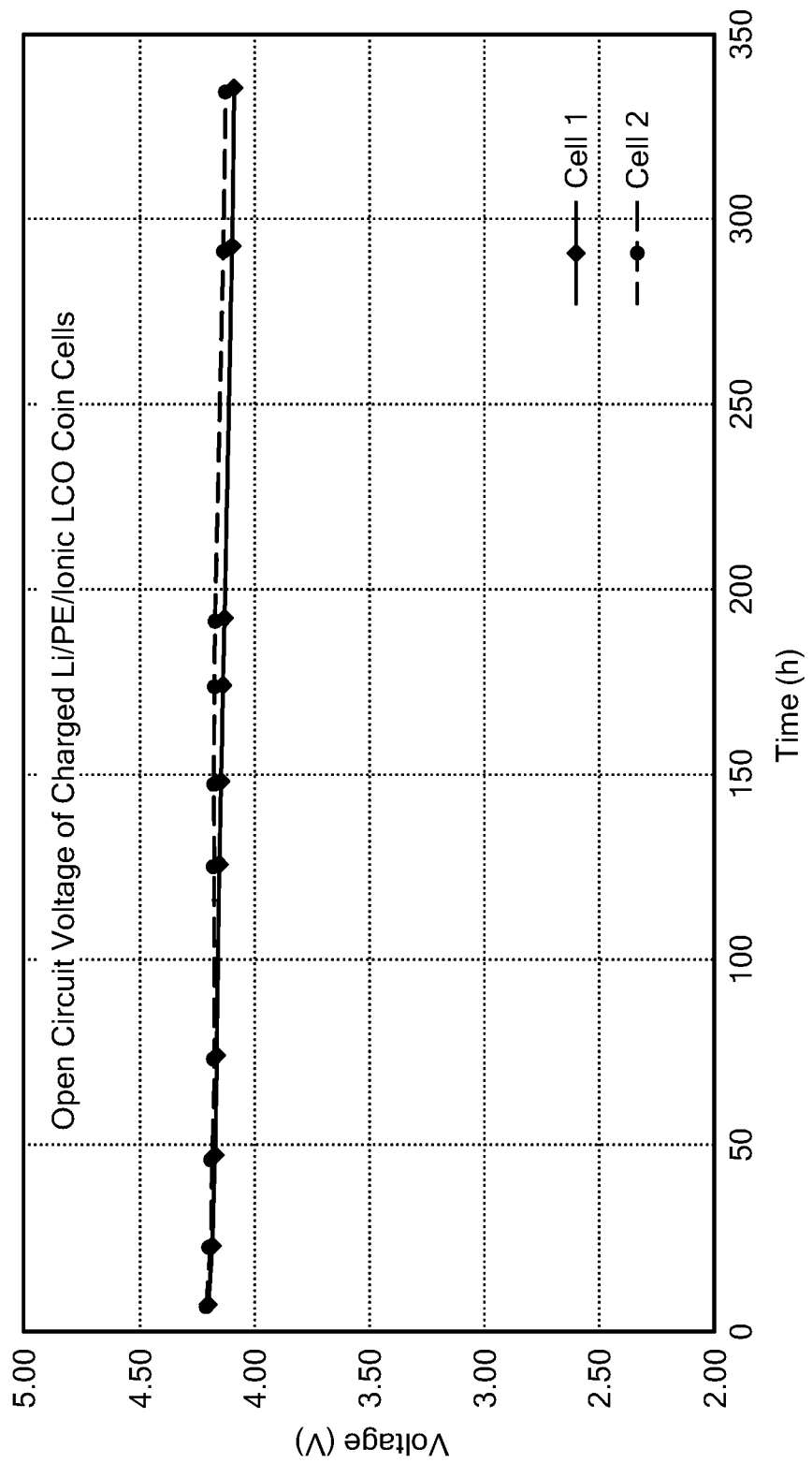
FIG. 10 is a voltage relative time plot of a battery described in Example 9.

The stability of the Li/ solid polymer electrolyte /LCO cells were tested on open circuit storage. This test utilized fully charged Li/SPE solid polymer electrolyte LCO cells, as described in Example 8, and stored the cells for a two-week period at room temperature. The cells displayed good voltage stability, as displayed in FIG. 10. Following the 2 weeks of open circuit storage, the cells were fully discharged and the discharge capacity was compared to the cell performance prior to storage. Both cells displayed 84 to 85% of pre-storage discharge (greater than 80%), demonstrating low self-discharge during the two-week storage, and further demonstrating the stability of the high voltage Li/SPE/LCO battery system.

Example 10

The solid polymer electrolyte of Example 3, specifically PPS/Chloranil/LiTFSI-LiFSI-LiBOB, was used to make a secondary lithium cell. The cell comprised a lithium metal anode, the solid polymer electrolyte was interposed between the anode and a slurry cathode. The slurry cathode also comprised the solid polymer electrolyte and the cathode is manufactured using a stepwise process. The process initially includes a polyvinylidene difluoride (PVDF) binder in a solvent such as N-Methyl-2-pyrrolidone (NMP) or Dimethylacetamide (DMA). Electrically conductive carbon and graphite and the solid polymer electrolyte are then added in a first mixing step in which the carbon and solid polymer electrolyte remain stable and insoluble in the binder solvent. This first mixture is then mixed in a second mixing step with a electrochemically active cathode material such as Lithium cobalt oxide ($LiCoO_2$)("LCO") to create a slurry mix which is then coated onto a cathode collector. After a drying step in which the binder solvent is driven out of the cathode, the cathode is calendared to create a high density cathode.

Table 4 details composition ranges for each of the cathode components included in the described slurry cathode process.

TABLE 4

| Cathode Component | Wt. % |
|---|---|
| Electrochemically Active Material | 70-90 |
| Solid Polymer Electrolyte | 4-15 |
| Electrically conductive carbon | 1-5 |
| Electrically conductive graphite | 1-5 |
| Binder | 3-5 |

The high density cathode is about 15 to 115 micrometers in thickness, and has a cathode coating density in the range of 1.2 to 3.6 g/cc.

The high density cathode is then added to the described secondary lithium cell and displays significant performance. Specifically, the lithium cell displays voltage stability above 5.0V to at least 5.5V (greater than 4.1V and 4.5 V); the lithium metal can be cycled through the solid polymer electrolyte a rates greater than 0.5 $mA/cm^2$, 1.0 $mA/cm^2$ and to at least 1.5 $mA/cm^2$ at room temperature, while also being able to cycle lithium in excess of an areal capacity of 3.0 $mAh/cm^2$ for greater than 10 cycles, and greater than 18.0 $mAh/cm^2$; being cycled for greater than 150 cycles at 1.0 $mA/cm^2$ and 0.25 $mAh/cm^2$; having greater than 80% depth of discharge of the lithium anode (i.e. fraction of the lithium metal present that is cycled, and over 70% depth of discharge for at least 10 cycles at 0.5 $mA/cm^2$ and 3 $mAh/cm^2$; and produces plated lithium on the anode current collector greater than 0.45 g/cc (greater than 0.4 g/cc) thus maintaining battery volume with little to no swelling.

While the invention has been described in detail herein in accordance with certain aspects thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A battery comprising:
    an anode comprising a first electrochemically active material;
    a cathode comprising both a second electrochemically active material and a first electrolyte; and
    a second electrolyte interposed between the anode and the cathode;

wherein at least one of the first electrolyte and the second electrolyte comprises a solid polymer electrolyte;
wherein the solid polymer electrolyte has a glassy state, and comprises both at least one cationic diffusing ion and at least one anionic diffusing ion;
wherein at least one of the at least one cationic diffusing ions comprises lithium;
wherein at least one of the at least one cationic diffusing ion and the at least one of the anionic diffusing ion is mobile in the glassy state; and
wherein the first electrochemically active material comprises a lithium metal;
wherein the glassy state extends in a range of temperatures of the solid polymer electrolyte from a melting temperature of the solid polymer electrolyte to a temperature lower than the melting temperature; and
wherein at least one of the at least one cationic diffusing ion and the at least one anionic diffusing ion has a diffusivity of greater than $1.0 \times 10^{-12}$ m$^2$/s.

2. The battery of claim 1, wherein an electronic conductivity of the solid polymer electrolyte is less than 1×10-8 S/cm at room temperature.

3. The battery of claim 1, wherein a melting temperature of the solid polymer electrolyte is greater than 250° C.

4. The battery of claim 1, wherein the solid polymer electrolyte is a thermoplastic.

5. The battery of claim 1, wherein an ionic conductivity of the solid polymer electrolyte is isotropic.

6. The battery of claim 1, wherein the solid polymer electrolyte is non-flammable.

7. The battery of claim 1, wherein the Young's modulus of the solid polymer electrolyte is equal to or greater than 3.0 MPa.

8. The battery of claim 1, wherein an ionic conductivity of the solid polymer electrolyte is greater than $1.0 \times 10^{-5}$ S/cm at room temperature.

9. The battery of claim 1,
wherein the solid polymer electrolyte comprises a single cationic diffusing ion;
wherein the at least one of the at least one single anionic diffusing ion comprises lithium; and
wherein a diffusivity of the single cationic diffusing ion is greater than $1.0 \times 10^{-12}$ m$^2$/s at room temperature.

10. The battery of claim 1,
wherein the solid polymer electrolyte comprises a single anionic diffusing ion; and
wherein a diffusivity of the single anionic diffusing ion is greater than $1.0 \times 10^{-12}$ m$^2$/s at room temperature.

11. The battery of claim 1, wherein at least one of the at least one anionic diffusing ion and the at least one cationic diffusing ion has a diffusivity greater than $1.0 \times 10^{-12}$ m$^2$/s.

12. The battery of claim 1, wherein the solid polymer electrolyte has an ionic conductivity greater than $1 \times 10^{-4}$ S/cm at room temperature.

13. The battery of claim 1, wherein the solid polymer electrolyte has an ionic conductivity greater than $1 \times 10^{-3}$ S/cm at 80° C.

14. The battery of claim 1, wherein the solid polymer electrolyte has an ionic conductivity greater than $1 \times 10^{-5}$ S/cm at −40° C.

15. The battery of claim 1, wherein a concentration of lithium is greater than 3 moles of lithium per liter of solid polymer electrolyte.

16. The battery of claim 1,
wherein the at least one cationic diffusing ion has a cationic diffusivity and the at least one anionic diffusing ion has an anionic diffusivity; and
wherein the cationic diffusivity is greater than the anionic diffusivity.

17. The battery of claim 1, wherein a cationic transference number of the solid polymer electrolyte is greater than 0.5 and less than 1.0.

18. The battery of claim 1, wherein the at least one anionic diffusing ion is monovalent.

19. The battery of claim 1, wherein at least one anionic diffusing ion comprises fluorine or boron.

20. The battery of claim 1, wherein there is at least one mole of the lithium per liter of solid polymer electrolyte.

21. The battery of claim 1, wherein the solid polymer electrolyte further comprises a heteroatom incorporated in a ring structure or positioned on a backbone adjacent the ring structure.

22. The battery of claim 21, wherein the heteroatom is selected from the group consisting of sulfur, oxygen and nitrogen.

23. The battery of claim 21, wherein the heteroatom is sulfur.

24. The battery of claim 1,
wherein the solid polymer electrolyte comprises a plurality of monomers; and
wherein a molecular weight of each monomer is greater than 100 grams/mole.

25. The battery of claim 1,
wherein the solid polymer electrolyte comprises:
a plurality of monomers; and
a plurality of charge transfer complexes;
wherein each of the plurality of charge transfer complexes is positioned on a corresponding monomer,
wherein an electronic conductivity of the solid polymer electrolyte is less than 1×10'S/cm at room temperature;
wherein each of the plurality of charge transfer complexes is formed by a reaction of a polymer, an electron acceptor, and an ionic compound; and
wherein each of the at least one cationic diffusing ion and the at least one anionic diffusing ion is a reaction product of the ionic compound.

26. The battery of claim 1,
wherein the solid polymer electrolyte is formed from at least one ionic compound; and
wherein the ionic compound comprises each of the at least one cationic diffusing ion and the at least one anionic diffusing ion.

27. The battery of claim 1, wherein the solid polymer electrolyte becomes ionically conductive after being doped by an electron acceptor in the presence of an ionic compound that either contains the at least one cationic diffusing ion and the at least one anionic diffusing ion or is convertible into both the at least one cationic diffusing ion and the at least one anionic diffusing ion via reaction with the electron acceptor.

28. The battery of claim 1, wherein the solid polymer electrolyte is formed from a reaction product of a base polymer, an electron acceptor and an ionic compound.

29. The battery of claim 28, wherein the base polymer is a conjugated polymer.

30. The battery of claim 28, wherein the base polymer is Polyphenylene Sulfide (PPS) or a liquid crystal polymer.

31. The battery of claim 1,
wherein both the first electrolyte and the second electrolyte comprise the solid polymer electrolyte; and
wherein an electronic conductivity of the second electrolyte is less than $1 \times 10^{-8}$ S/cm at room temperature.

32. The battery of claim 1, wherein both the first electrolyte and the second electrolyte comprise the solid polymer electrolyte.

33. The battery of claim 1,
wherein the anode comprises a third electrolyte; and
wherein the third electrolyte comprises the solid polymer electrolyte.

34. The battery of claim 1,
wherein the second electrolyte comprises the solid polymer electrolyte and is formed into a film; and
wherein the thickness of the film is between 200 and 15 micrometers.

35. The battery of claim 1, wherein the second electrochemically active material comprises an intercalation material.

36. The battery of claim 1, wherein the second electrochemically active material comprises a lithium oxide comprising a component selected from the group consisting of nickel, cobalt, manganese, and a combination of at least two of the aforementioned.

37. The battery of claim 1, wherein the second electrochemically active material has an electrochemical potential greater than 4.2 volts relative lithium metal.

38. The battery of claim 1, wherein the cathode has an electrode potential greater than 4.2 volts relative lithium metal.

39. The battery of claim 1, wherein the second electrochemically active material is intermixed with an electrically conductive material and the solid polymer electrolyte.

40. The battery of claim 39, wherein the electrically conductive material comprises carbon.

41. The battery of claim 1, wherein the cathode comprises 70-90 percent by weight of the second electrochemically active material.

42. The battery of claim 1, wherein the cathode comprises 4-15 percent by weight of the solid polymer electrolyte.

43. The battery of claim 1, wherein the cathode comprises 2-10 percent by weight of an electrically conductive material.

44. The battery of claim 43, wherein the electrically conductive material comprises carbon.

45. The battery of claim 1, wherein the cathode is formed from a slurry.

46. The battery of claim 1, wherein the cathode is positioned on a cathode collector.

47. The battery of claim 1, wherein the second electrochemically active material comprises a lithium oxide or a lithium phosphate, each of the lithium oxide or the lithium phosphate containing nickel, cobalt or manganese.

48. The battery of claim 1,
wherein the second electrochemically active material comprises an intercalation material; and
wherein the intercalation material comprises lithium.

49. The battery of claim 48, wherein the lithium intercalation material comprises at least one material selected from the group consisting of Lithium Nickel Cobalt Aluminum Oxide, Lithium Nickel Cobalt Manganese Oxide, Lithium Iron Phosphate, Lithium Manganese Oxide, Lithium Cobalt Phosphate, Lithium Manganese Nickel Oxide, Lithium Cobalt Oxide, LiTiS2, LiNiO2, and a combination of at least two of the aforementioned materials.

50. The battery of claim 1, wherein the second electrochemically active material comprises an electrochemically active cathode compound that reacts with lithium in a solid state redox reaction.

51. The battery of claim 50, wherein the electrochemically active cathode material comprises a material selected from the group consisting of a metal halide, Sulfur, Selenium, Tellurium, Iodine, Pyrite ($FeS_2$) and $Li_2S$.

52. The battery of claim 50,
wherein the lithium intercalation material comprises Lithium Nickel Cobalt Manganese Oxide; and
wherein an atomic concentration of nickel in the Lithium Nickel Cobalt Manganese Oxide is greater than an atomic concentration of cobalt or manganese.

53. The battery of claim 1, wherein the first electrochemically active material comprises an intercalation material.

54. The battery of claim 53,
wherein the anode further comprises the solid polymer electrolyte; and
wherein the first electrochemically active material is mixed with the solid polymer electrolyte.

55. The battery of claim 1, further comprising an anode current collector in ionic communication with the anode;
wherein lithium deposits on the anode current collector when the battery is charged.

56. The battery of claim 55, wherein a density of the lithium deposited on the anode current collector is greater than 0.4 g/cc.

57. The battery of claim 1, further comprising an anode current collector in ionic communication with the anode;
wherein the electrolyte is positioned adjacent the anode current collector.

58. The battery of claim 54, wherein the first electrochemically active material comprises Silicon, Tin, antimony, lead, Cobalt, Iron, Titanium, Nickel, Magnesium, Aluminum, Gallium, Germanium, Phosphorus, Arsenic, Bismuth, Zinc, Carbon, and a mixture of at least two of the aforementioned.

59. The battery of claim 1,
wherein the second electrochemically active material comprises an intercalation material.

60. The battery of claim 59, wherein the charged voltage of the battery is greater than 4.1 volts.

61. The battery of claim 59, wherein the charged voltage of the battery is greater than 4.5 volts.

62. The battery of claim 59, wherein the charged voltage of the battery is greater than 5.0 volts.

63. The battery of claim 1, wherein lithium is cycled between the anode and cathode at a rate greater than 0.5 $mA/cm^2$ at room temperature.

64. The battery of claim 1, wherein lithium is cycled between the anode and cathode at a rate greater than 1.0 $mA/cm^2$ at room temperature.

65. The battery of claim 55, wherein the lithium is cycled between the anode and cathode for greater than 150 cycles.

66. The battery of claim 1, wherein lithium is cycled between the anode and cathode at a rate greater than 3.0 $mAh/cm^2$ at room temperature for greater than ten cycles.

67. The battery of claim 1, wherein lithium is cycled between the anode and cathode at a rate greater than 18.0 $mAh/cm^2$.

68. The battery of claim 1, wherein lithium is cycled between the anode and cathode at a rate greater than 0.25 $mAh/cm^2$ at room temperature for greater than 150 cycles.

69. The battery of claim 1, further comprising an anode current collector,
wherein lithium is plated onto the anode current collector when the battery is charged; and
wherein a density of the lithium plated onto the anode current collector is greater than 0.4 g/cc.

70. The battery of claim 1, wherein the lithium cycling efficiency is greater than 99%.

71. The battery of claim 1, wherein the second electrolyte comprises the solid polymer electrolyte and is formed into a film; and wherein the first electrolyte comprises the solid polymer electrolyte, whereby the second electrolyte is attached to the cathode.

72. The battery of claim 1, wherein the second electrolyte comprises the solid polymer electrolyte and is formed into a film;

wherein the anode comprises a third electrolyte; and wherein the third electrolyte comprises the solid polymer electrolyte, whereby the second electrolyte is attached to the anode.

* * * * *

UNITED STATES PATENT AND TRADEMARK OFFICE
CERTIFICATE OF CORRECTION

PATENT NO. : 11,145,899 B2
APPLICATION NO. : 16/776088
DATED : October 12, 2021
INVENTOR(S) : Michael A. Zimmerman and Randolph Leising It is certified that error appears in the above-identified patent and that said Letters Patent is hereby corrected as shown below:

In the Claims

Column 24, Line 34 (Claim 25) should read:
-- electrolyte is less than $1 \times 10^{-8}$ S/cm at room temperature; --

Signed and Sealed this
Twenty-sixth Day of April, 2022

Katherine Kelly Vidal
*Director of the United States Patent and Trademark Office*